(12) United States Patent
Bourlas

(10) Patent No.: US 8,169,960 B2
(45) Date of Patent: May 1, 2012

(54) PERSISTENT RESOURCE ALLOCATION

(75) Inventor: Yair Bourlas, San Diego, CA (US)

(73) Assignee: Wi-LAN, Inc., Ottawa, Ontario (CA)

( * ) Notice: Subject to any disclaimer, the term of this patent is extended or adjusted under 35 U.S.C. 154(b) by 789 days.

(21) Appl. No.: 12/205,436

(22) Filed: Sep. 5, 2008

(65) Prior Publication Data

US 2009/0075667 A1    Mar. 19, 2009

Related U.S. Application Data

(60) Provisional application No. 60/971,526, filed on Sep. 11, 2007, provisional application No. 61/013,622, filed on Dec. 13, 2007.

(51) Int. Cl.
*H04W 72/00* (2009.01)

(52) U.S. Cl. .................................. 370/329; 455/452.1

(58) Field of Classification Search ................. 370/329, 370/328, 338, 431, 468; 455/456.6, 450, 455/452.1

See application file for complete search history.

(56) References Cited

U.S. PATENT DOCUMENTS

| | | |
|---|---|---|
| 2001/0010687 A1 | 8/2001 | Lee |
| 2005/0286408 A1 | 12/2005 | Jin et al. |
| 2006/0293076 A1* | 12/2006 | Julian et al. ................... 455/522 |
| 2007/0280166 A1 | 12/2007 | Jung et al. |
| 2007/0298822 A1 | 12/2007 | Wan et al. |
| 2008/0020778 A1* | 1/2008 | Pi ................................. 455/450 |
| 2008/0062944 A1* | 3/2008 | Smith et al. ................... 370/342 |
| 2008/0117891 A1* | 5/2008 | Damnjanovic et al. ....... 370/345 |

FOREIGN PATENT DOCUMENTS

| | | |
|---|---|---|
| EP | 1753256 A1 | 2/2007 |
| KR | 10-2006-0056141 A | 5/2006 |
| KR | 10-2007-0068434 A | 6/2007 |

OTHER PUBLICATIONS

Harris et al., "Resource Shifting in Persistent Scheduling," IEEE 802.16 Broadband Wireless Access Working Group, IEEE C802.16maint.-08/111r1 (Mar. 17, 2008).
Harris et al., "Resource Shifting in Persistent Scheduling," IEEE 802.16 Broadband Wireless Access Working Group, IEEE C802.16maint.-08/111r2 (Mar. 17, 2008).
Bourlas et al., "Persistent Allocation Error Recovery," IEEE 802.16 Broadband Wireless Access Working Group, IEEE C802.16maint.-08/252r3 (Jul. 16, 2008).

* cited by examiner

*Primary Examiner* — Brian Nguyen
(74) *Attorney, Agent, or Firm* — Volpe and Koenig, P.C.

(57) ABSTRACT

Methods and apparatus for communicating and utilizing persistent allocation of uplink resources are described herein. A base station can allocate persistent uplink resources to a client station, such that the resource allocation remains active for future uplink frames without the client station repeating a request for uplink resources or the base station expressly communicating the uplink resource allocation. A client station can request a persistent uplink resource allocation when wireless channel conditions are fairly consistent and not varying and the required uplink resources are predictably periodic and fixed in size. The base station can verify that the uplink resource request meets the criteria for persistent allocation and can allocate persistent uplink resources in a dedicated information element of an uplink resource map that is transmitted to the user. The resources allocated remain allocated to the client station in each frame satisfying a predetermined periodicity until deallocated.

11 Claims, 14 Drawing Sheets

PERSISTENT RESOURCE ALLOCATION

CROSS-REFERENCES TO RELATED APPLICATIONS

The application claims the benefit of U.S. Provisional Patent Application No. 60/971,526 filed Sep. 11, 2007 for "PERSISTENT UPLINK RESOURCE ALLOCATION"; and U.S. Provisional Patent Application No. 61/013,622 filed Dec. 13, 2007 for "ERROR CORRECTION FOR A PERSISTENT RESOURCE ALLOCATION"; which are all incorporated herein by reference in their entirety for all purposes.

BACKGROUND OF THE INVENTION

I. Field of the Invention

The present disclosure relates to the field of wireless communications. More particularly, the present disclosure relates to the field of resource allocation in a wireless communication system.

II. Description of Related Art

Wireless communication systems may support discontinuous transmission in which the various parties to a communication link use resources only as needed. Limiting the allocation and consumption of resources to those devices actively engaged in communications increases the efficiency of a wireless communication system. However, each device may need to request an allocation of resources before it is granted the opportunity to communicate. The request and grant of communication resources can itself consume a large amount of resources that otherwise could be used to support additional users or provide increased bandwidth to active users.

It is desirable to minimize the amount of resources consumed in requesting and granting resources for discontinuous communications. However, there remains the need to maximize the flexibility in generating access requests and allocating the resources associated with the access requests.

BRIEF SUMMARY OF THE INVENTION

Methods and apparatus for communicating and utilizing persistent allocation of uplink resources are described herein. A base station can allocate persistent uplink resources to a client station, such that the resource allocation remains active for future uplink frames without the client station repeating a request for uplink resources or the base station expressly communicating the uplink resource allocation. A client station can request a persistent uplink resource allocation when the required uplink resources are predictably periodic and fixed in size. The base station can verify that the uplink resource request meets the criteria for persistent allocation and can allocate persistent uplink resources in a n information element of an uplink resource map that is transmitted to the user. The resources allocated remain allocated to the client station in each frame satisfying a predetermined periodicity until deallocated.

Among other things, described herein are methods and apparatuses for efficiently assigning persistent resources. In one aspect, when at least one persistent allocations is made or updated, the base station sends an information element to a set of client stations. The information element includes a start allocation and a list of express grants of persistent allocations. The start allocation indicates a delineation between a set of previously assigned persistent allocations and a set of persistent and/or non-persistent allocations defined by the current information element. When received by a client station, the client station compares the start allocation with the starting point of its current persistent allocation. If the starting point is logically before the start allocation, the client station continues to operate according to the previously assigned persistent allocation. If its starting point is logically after the start allocation, the client station begins to operate according any grant included within the current information element. In one aspect, the base station assigns resources to the client stations in a logical order based upon the probability that the client station will incur an update to its persistent allocation.

In one aspect, the base station sends a first information element specifying a first, second and third persistent allocation for a first, second and third client station respectively, wherein the first, second and third persistent allocations occur in numerical order in a logical mapping. The base station may further determine a need for an update to the second persistent allocation and, therefore, send a second information element specifying a start location and a revised second and third allocation, wherein the start allocation indicates a delineation with the logical mapping between a set of previously assigned allocations and a set of allocations defined by the second information element.

A client station may receive a first information element specifying a first persistent allocation occurring at a fixed point with a logical mapping. It may also receive a second information element specifying a start allocation indicating a change point within the logical mapping. In addition, it may continue to operate according to the first persistent allocation if the fixed point occurs logically before the change point. Otherwise, the client station operates according to a newly specified persistent allocation as indicated in the second information element if the fixed point occurs logically after the change point. In another aspect, the client station ceases to operate according to the first persistent allocation if the fixed point occurs logically after the change point and no new persistent allocation is included within the second information element.

In one aspect, the base station has a persistent candidate processor configured to determine a set of client stations for which persistent resource are to be allocated in an upcoming frame. The base station may include a group scheduler configured to determine a logical mapping for the upcoming frame including an allocation for each client station in the set of client stations. The base station can also include persistent uplink information element generator configured to determine a first information element which includes an express allocation for each client station in the set of client stations which requires an updated persistent allocation and a start location within the logical mapping, wherein the start allocation indicates a delineation between a set of previously assigned allocations and a set of allocations assigned by the first information element. The base station may also have a transmitter is configured to transmit the first information element to a plurality of client stations.

In another aspect, the client station has a receiver configured to receive a first and second information element and an uplink map module configured to determine whether the first information element specifies a first persistent allocation occurring at a fixed point with a logical mapping. The client station also has a storage device for storing information concerning the first persistent allocation. The uplink map module determines whether the second information element specifies a start allocation indicating a change point within the logical mapping and instructs an uplink resource mapper to continue to operate according to the first persistent allocation if the fixed point occurs logically before the change point.

The base station, according to an optional feature, determines a rate of change factor for each one of a set of client stations to determine a logical mapping for grant of persistent allocations for the set of client stations based at least in part on the rate of change factor. The base station orders the persistent allocations such that a first client station with a lower rate of change factor is scheduled logically before a second client station with a higher rate of change factor. The base station's determination of the rate of change factor may be based at least in part on one or more factors including a mobility factor, a modulation and coding scheme, a voice activity factor and a channel quality indication.

A base station has, in one embodiment, a persistent candidate processor configured to determine a set of client stations for which persistent resource are to be allocated in an upcoming frame and a group scheduler configured to determine a logical mapping for the upcoming frame including an allocation for each client station in the set of client stations, wherein the logical mapping is based at least in part on a rate of change factor associated with each client station in the set of client stations.

The client station receives, in one embodiment, a first information element specifying a first persistent allocation occurring at a fixed point with a logical mapping, The client station then receives a second information element including a mask. The client station continues to operate according to the first persistent allocation if the mask indicates that the first persistent allocation has not been deallocated and that no persistent allocation occurring logically earlier than the first persistent allocation has been deallocated. In some embodiments the second information element includes an indication of the magnitude of a deallocated persistent allocation. The client station determines a new persistent allocation if a second persistent allocation occurring logically earlier than the first persistent allocation has been deallocated. The client station further may shift the first persistent allocation logically earlier according to a magnitude of the second persistent allocation. In one aspect, the second information element specifies the magnitude of the second persistent allocation.

According to an optional feature, the base station sends one or more information elements specifying a first, second and third persistent allocation for a first, second and third client station respectively, wherein the first, second and third persistent allocations occur in numerical order in a logical mapping. The base station later sends a subsequent information element using a mask to commanding that the second client station cease operation on the second persistent allocation.

Certain additional means for implementing all of these aspects are also disclosed. Many aspects may be stored in a computer-readable medium. Additional aspects of the present disclosure are detailed in the description provided herein and associated figures.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Figure 1:
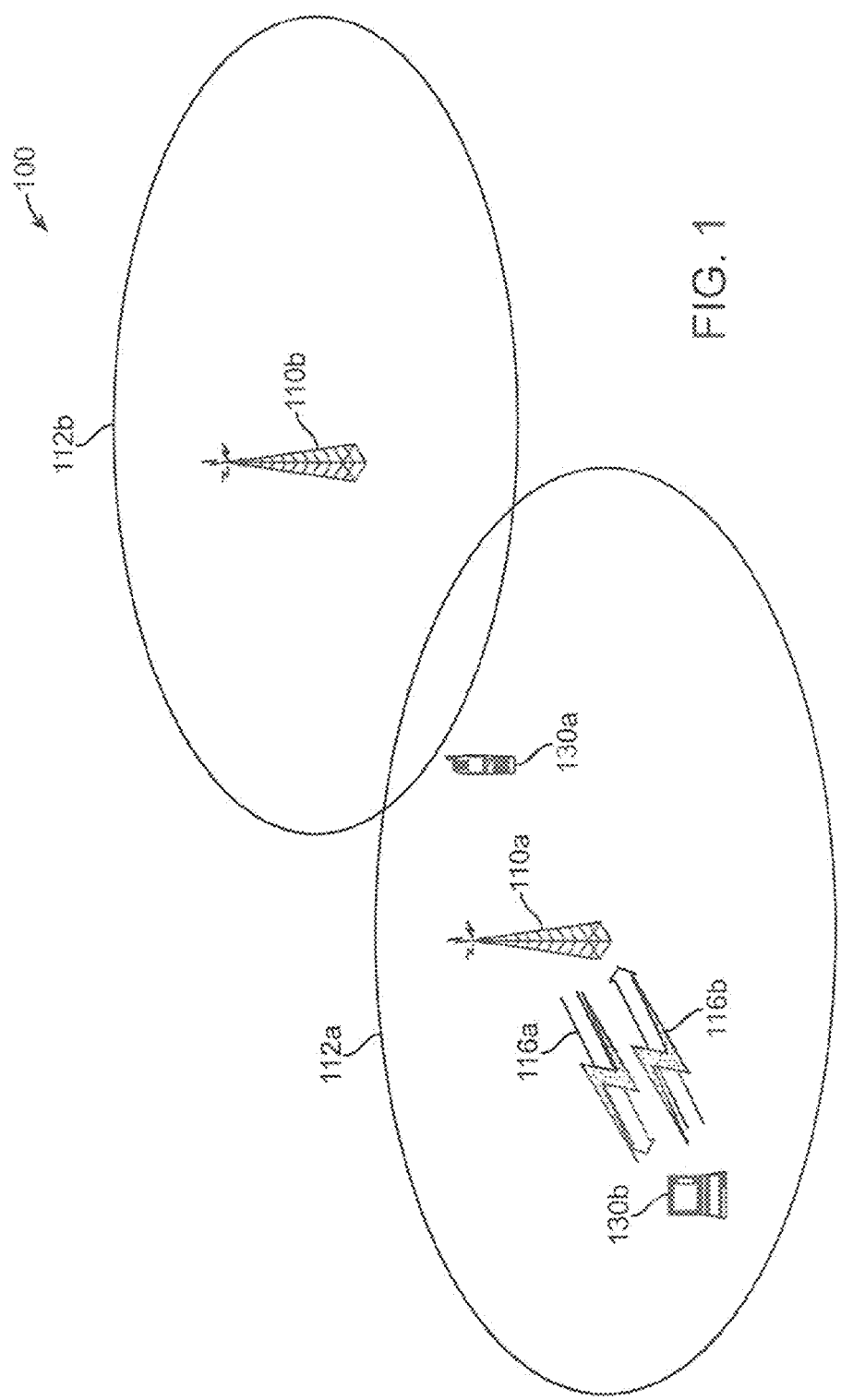
FIG. 1 is a simplified functional block diagram of an embodiment of a wireless communication system.

A base station in a wireless communication system can implement persistent uplink resource allocation (also known as a sticky allocation) to reduce the signal bandwidth and processing associated with receiving an uplink resource request from a client station, determining the proper resource allocation, scheduling the resource allocation, and communicating the resource allocation to the requesting client station.

When the base station assigns a standard non-persistent downlink or uplink allocation for use by a client station, the allocation is valid for a predetermined frame, such as a frame in which the allocation is granted or the frame following the frame in which the allocation is granted, depending on the allocation relevancy. In contrast, when a base station assigns a persistent downlink or uplink allocation to a client station, the allocation typically remains valid for multiple future downlink or uplink frames. Thus, the client station does not need to repeat a request for uplink resources periodically over a long series of frames. Nor does the base station need to expressly and repeatedly identify a downlink or uplink resource allocation in a series of downlink or uplink map information element (IE) messages.

A client station typically requests a persistent downlink or uplink allocation when the client station is producing a constant or predictable data stream such as one which is predictably periodic and in which the packets are generally fixed in size. For example, when a client station has established a voice over Internet protocol (VoIP) connection, a steady stream of voice packets will typically be produced. The base station can verify that the downlink or uplink resource request meets the criteria for persistent resource allocation and allocate persistent downlink or uplink resources as part of a persistent downlink or uplink map information element (IE) message that is transmitted to the client stations in the system.

In addition, the base station may have the ability to determine that a client station is a candidate for a persistent downlink or uplink resource allocation. For example, the base station can determine that a client station is a candidate for a persistent downlink or uplink resource allocation based on one or more parameters. The parameters can include, for example, repeated requests for uplink resource allocations from the client station, the consistency of the resource allocation requested, stability of characteristics of a wireless channel between the base station and the client station, knowledge of the packet arrival distribution, and the type of connection. As an example, if the connection is in support of VoIP communication, the base station typically knows that the packet arrival pattern is a good candidate for persistent resource allocation.

The persistent allocation remains dedicated to the client station in future frames until a predetermined terminating event, such as a passage of time, passage of a predetermined number of frames, the base station notifying the client station that the resource has been changed or deallocated, a base station reallocating all or part of resources allocated to another client station, and the like or some combination thereof. The base station may deallocate a persistent resource by sending a revised persistent downlink or uplink map IE which no longer allocates a persistent resource to the client station or reallocates persistent resources to the client station. In one aspect, the base station sends an express deallocation message.

The base station can group the client station resource request and resource allocation to any one of multiple persistence groups. The base station can select a persistence group for a particular client station based on such factors as a traffic arrival pattern, a power class of the client station, load balancing at the base station, and the like or some combination thereof.

The base station can allocate resources to the client stations in each of the persistence groups such that members of each persistence group transmit in a frame distinct from any other persistence group. Similarly, the base station can allocate persistent resources to the client stations in each of the persistence groups such that members of each persistence group receive in a frame distinct from any other persistence group.

For example, each persistence group can be associated with a group cycle number and a persistent resource allocation can be valid for frames associated with the group cycle index. In one embodiment, the persistence groups can be time cycled in a round-robin schedule in order to provide uniform access and a uniform rate across the multiple persistence groups. A simple implementation utilizes the frame number and group cycle index to identify the active persistence group associated with a particular frame. The active persistence group can be identified by determining the modulo function of the frame number and the total number of persistence groups, typically notated as MOD (frame number, N), and comparing the result against the group cycle index, where N represents the number of persistence groups. (The modulo operation returns the remainder of division of one number by another. Given two numbers, a (the dividend) and x (the divisor), mod (a,x) is the remainder of division of a by x. For instance, the expression MOD (7,3) would evaluate to 1, while MOD (9,3) would evaluate to 0.)

The client station need not have any knowledge of its group cycle index and only needs to know the number of persistence groups, N. The client station can determine its group cycle index by determining the value of MOD (frame number, N) for the first frame number for which it is allocated persistent downlink or uplink resources. Groups may also be identified and associated with client stations explicitly by communicating a period parameter in the persistent allocation IE.

In other aspects, the persistence groups can be predetermined based on an algorithm which is less periodic than the modulo aspect described above. For example, the persistence groups could be determined based on a pseudo random pattern. In yet other aspects, periodic, pseudo random and other means of forming persistence groups may be used.

In a typical Orthogonal Frequency Division Multiple Access (OFDMA) system, the base station can distinguish data coming from the various client stations according to time (number of symbols) and frequency (number of subcarriers). Of course in other systems, the base station may distinguish data coming from the various client stations according to some other physical layer (PHY) characteristics associated with the system.

To reduce overhead, the base station typically does not assign individual physical layer units to the client stations. Instead, the physical layer units are grouped together into "allocation units." The base station assigns resources to the client stations by specifying one or more allocation units, rather than designating individual physical layer units. An allocation unit can be, for example, a combination of a predetermined number of subcarriers and symbols. In one embodiment, a minimum allocation unit is referred to as a "slot," and a slot encompasses a predetermined number of subcarriers in one or more OFDMA symbols.

According to IEEE 802.16, communication on both the uplink and the downlink are divided into frames of fixed a length. Each frame includes a downlink subframe and uplink subframe. The downlink subframe typically includes link management transmissions (such as synchronization signals and the like), overhead channels (such as the fast feedback channels discussed below), a number of downlink allocation units for carrying user data from the base station to the client stations as well as other types of overhead and data transmissions. The uplink subframe includes many of the same categories of transmissions, including uplink allocation units for carrying user data from the client station to the base station and control signaling channels for system control, administration and the like.

Modulation is the process of encoding information onto a signal for transmission. Many modulation schemes are well known in the art including binary phased shift keying (BPSK), quadrature phase shift keying (QPSK) and quadrature amplitude modulation (QAM.) Modulation schemes differ from one another according to the amount of data carried by any one symbol. Higher order modulation schemes carry more data per symbol. For example, a 16 QAM symbol carries 4 bits of data per symbol while BPSK modulation carries only one bit of data per symbol.

Higher order modulation schemes are more susceptible to channel conditions than lower order modulation schemes. Thus, use of a higher order modulation scheme is more likely to result in errors than use of a lower order modulation scheme under poor channel conditions.

However higher order modulation schemes are more efficient in terms of the amount of information that can be transferred over the wireless link in a fixed period of time. Thus, within a fixed period of time, more data can be transferred over the link using a higher order modulation scheme than a lower order modulation scheme if channel conditions are good. Thus, transmissions using lower order modulation schemes are more robust, but less efficient, and transmissions using higher order modulation schemes are less robust but more efficient.

In order to improve the performance of the wireless link, error correction coding, such as forward error correction (FEC), can be applied at the transmitter. Using complex error correction schemes, some type of redundancy is introduced in the data before transmission. The code rate typically refers to the length of the uncoded information divided by the length of the resulting encoded information. The redundancy can be used to correct for errors which are introduced by the wireless channel. The effectiveness of a coding scheme is measured in terms of coding gain, which can be expressed as the difference between the signal to noise level required to reach the same bit error rate level for encoded and uncoded data. Modern error correction coding techniques provide substantial coding gains. However, due to the redundancy introduced, the use of error correction coding typically decreases the effective rate at which data is transmitted over the channel. Therefore, transmissions using codes having higher redundancy rates are more robust, but less efficient than, transmissions using codes having lower redundancy rates.

The IEEE 802.16e standard and its progeny define a variety of modulation and coding scheme (MCS) combinations. The MCS specifies a type of modulation as well as a type of forward error correction which the client station will use on uplink transmissions. The MCS combinations accommodate the large variation in performance associated with the client stations scattered throughout the coverage area. Proper selection of an MCS combination is important to both the efficiency and performance of a wireless link.

When the base station assigns an allocation unit to a specific client station, it also specifies the MCS combination to be used on the allocation, whether persistent and non-persistent resource allocations.

Once the base station sends a persistent resource allocation, generally it need not resend the resource allocation unless a change to the downlink or uplink resource allocations makes it advantageous to resend the resource allocation. For example, a new full or partial persistent uplink map IE may be sent when there is a need to change the size of the allocation. Such a size change may occur if the operating conditions of the client station assigned a persistent allocation are altered or otherwise change to such a degree that use of a new MCS combination is advantageous. Among other reasons, the base station typically resends the persistent downlink or uplink map IE to identify the new MCS combination and to assign the client station fewer or more allocation units as appropriate. In addition, a new persistent downlink or uplink map IE may be sent when a voice activity state changes, thus changing the rate of occurrence of the persistent allocation. In addition the base station typically resends the persistent uplink map IE if requested by the client station to do so, and may alter a persistent map accordingly. Of course, the base station can be configured to periodically resend the persistent downlink or uplink map IE even if no changes have occurred to permit client stations in the base station coverage area to verify the persistent downlink and uplink resource allocations. In addition, there may be several other instances in which persistent downlink and uplink map IE are resent, some of which are discussed below.

The descriptions contained herein generally focus on OFDMA wireless communication systems, and particularly are directed towards IEEE 802.16 wireless communication systems or wireless communication systems based on IEEE 802.16e as modified or otherwise extended or enhanced by the methods and apparatus described herein. However, the implementation of persistent downlink or uplink resource allocation scheme in an IEEE 802.16e system is used merely as an example. The use of a persistent downlink or uplink resource allocation scheme can be implemented in virtually any type of wired or wireless communication system.

In one aspect, the base station can be configured to just update the portion of the persistent uplink resource allocation information that follows the persistent resource allocation information that changes. The persistent resource allocation information occurring prior to the change need not be resent.

A client station that is allocated a persistent uplink resource can also experience reduced processing. The client station can request a persistent allocation or otherwise receive a persistent resource allocation from the base station in response to a resource request. The client station can determine the group cycle index for the persistent allocation in order to identify the frames for which its resource allocation are valid. The client station can continue to use the resource allocation until communications are completed, the client station requests a change, or the base station notifies the client station of a resource allocation update.

The client station can store a newly received persistent resource allocation information element allocating the persistent uplink resources. The client station can compare the new persistent resource allocation information element to the stored state to determine if its resource allocation has changed.

For example, if the client station determines that a resource allocation map includes no persistent uplink resource allocations, then the client station may determine that no changes have occurred. If the client station receives persistent resource allocation information, it can compare some or all of the received information against the stored state to determine if its resource allocation has been temporarily or permanently reallocated.

FIG. 1 is a simplified functional block diagram of an embodiment of a wireless communication system 100. The wireless communication system 100 includes a plurality of base stations 110*a*, 110*b*, each supporting a corresponding service or coverage area 112*a*, 112*b*. Each base station 110*a* and 110*b* can be coupled to a network (not shown) such as a wired network, and can be configured to allow wireless communication with devices on the wired network.

A base station, for example 110*a*, can communicate with wireless devices within its coverage area 112*a*. For example, the first base station 110*a* can wirelessly communicate with a first client station 130*a* and a second client station 130*b* within the coverage area 112*a* over a downlink 116*a* and an uplink 116*b*. In another example, the first client station 130*a* can communicate with a remote device (not shown) via the first base station 110*a*. The downlink is a path from the base station to the client station. The uplink is the path from the client station 130 be to the base station.

The base stations, 110*a* and 110*b*, can be part of the same communication network or can be part of distinct communications networks. The base stations 110*a* and 110*b* can be in communication with each other, either through a direct communication link or via an intermediary network. Alternatively, where the base stations 110*a* and 110*b* are in distinct networks, a first base station 110*a* may have no knowledge regarding the operation of the second base station 110*b*.

Although for simplicity only two base stations are shown in FIG. 1, a typical wireless communication system 100 includes a much larger number of base stations. The base stations 110*a* and 110*b* can be configured as cellular base station transceiver subsystems, gateways, access points, radio frequency (RF) repeaters, frame repeaters, nodes or any wireless network entry point.

Although only two client stations 130*a* and 130*b* are shown in the wireless communication system 100, typical systems are configured to support a large number of client stations. The client stations 130*a* and 130*b* can be mobile, nomadic or stationary units. The client stations 130*a* and 130*b* are often referred to as, for example, mobile stations, mobile units, subscribers, subscriber units, client stations, user devices, wireless terminals or the like. A client station can be, for example, a wireless handheld device, a vehicle mounted device, a portable device, client premise equipment, a fixed location device, a wireless plug-in accessory or the like. In some cases, a client station can take the form of a handheld computer, notebook computer, wireless telephone, personal digital assistant, wireless email device, personal media player, meter reading equipment or the like and may include a display mechanism, microphone, speaker and memory.

In one example, the wireless communication system 100 is configured for OFDMA communications. For example, the wireless communication system 100 can be configured to substantially comply with a standard system specification, such as IEEE 802.16e or some other wireless standard. In one aspect, the wireless communication system 100 can support the persistent downlink or uplink resource allocation described herein as an extension or enhancement to the system standard or as part of a system standard.

The wireless communication system 100 is not limited to an OFDMA system, and use of persistent uplink resource allocation described herein is not limited to application in OFDMA systems. The description is offered for the purposes of providing a particular example of the operation of persistent uplink resource allocation in a wireless communication environment.

The base stations 110a and 110b are configured to transmit data packets to the client stations 130a and 130b organized in frames. Each frame can include a number of allocation units.

Each base station, for example 110a, can supervise and control the communications within its respective coverage area 112a. Each active client station, for example 130a, registers with the base station 110a upon entry into the coverage area 112a. The client station 130a can notify the base station 110a of its presence upon entry into the coverage area 112a, and the base station 110a can interrogate the client station 130a to determine the capabilities of the client station 130a.

The base station 110a assigns one or more temporary identifiers to the client station 130a for use in identifying the client station 130a to the base station 110a. The temporary identifier can be referred to as a Connection Identifier (CID). The system can allocate a predetermined range of numbers or characters for the CID, and reserves a number of bits necessary to support the maximum CID value in each message requiring a CID value. In many systems, a client station may establish more than one connection and be associated with a plurality of CID values. For example, if a handheld device is both surfing the Internet and participating in a voice over IP call, each of the connections may be assigned an individual CID value. Thus, although for simplicity sake a persistent allocation is typically referred to herein as assigned to a particular client station, in many systems, the persistent allocations are assigned per connection rather than per client station.

In a packet based wireless communication system 100, it may be advantageous for the system to allocate resources as needed, rather than maintaining an active channel assignment for each client station 130a or 130b having an established communication session with a base station 110a or 110b. The base station 110a can allocate resources to the client station 130a on an as needed basis. For example, in an OFDMA system, the base station 110a can allocate time and frequency resources to each client station 130a when the client station 130a has information to send to the base station 110a.

The client stations 130a and 130b can notify the serving base station, for example, 110a, when the client stations 130a and 130b are reporting information to the base station 110a or when the client stations 130a and 130b request uplink resources. Each base station, for example 110a, can allocate some resources to support a random access channel (RAC), dedicated control channel or other signaling path used by the client stations 130a and 130b to report or request resources.

The base station 110a can periodically allocate resources to support the random access channel. In one embodiment, the base station 110a can support a random access channel in each uplink frame. For example, a base station 110a can allocate a portion of the uplink to a random access channel. The base station 110a can allocate, for example, a time, duration, and number of OFDM subcarriers on the uplink portion for the random access channel. Each of the random access channel parameters may be static or may be dynamic. The base station 110a can include the random access channel allocation information in a downlink portion that is broadcast across its associated coverage area 112a.

The client station 130a may transmit a bandwidth request to the base station 110a using the random access channel, a dedicated control channel, piggyback messaging, in band messaging or other signaling path. In response to the request, the base station 110a may allocate uplink resources to the client station 130a.

The wireless communication system 100 can eliminate the need for a continual request and grant of resources by utilizing persistent uplink resource allocations. A client station, e.g. 130a, may request a persistent resource allocation or a base station, e.g. 110a may determine that a client station 130a is a candidate for a persistent resource allocation.

For example, a first client station 130a may be engaged in bursty transmissions, require limited uplink resources, communicate latency insensitive transmissions, or may otherwise not be a candidate for a persistent resource allocation. Additionally, a rapidly changing wireless channel between the first client station 130a and the base station 110a, for example, due to mobility, may make the uplink communications from the first client station 130a less conducive to persistent resource allocations.

In contrast, a second client station 130b may be relatively stationary, or otherwise may have relatively constant wireless channel characteristics. Additionally, the second client station 130a may desire to support regular, latency sensitive communications over the uplink, such as when supporting voice over IP (VoIP). The base station 110a may recognize that the second client station 130b is a better candidate for persistent uplink resource allocation, and may therefore allocate persistent uplink resources to the second client station 130b. The base station may allocate an uplink persistent allocation, downlink persistent allocation or both.

Figure 2:
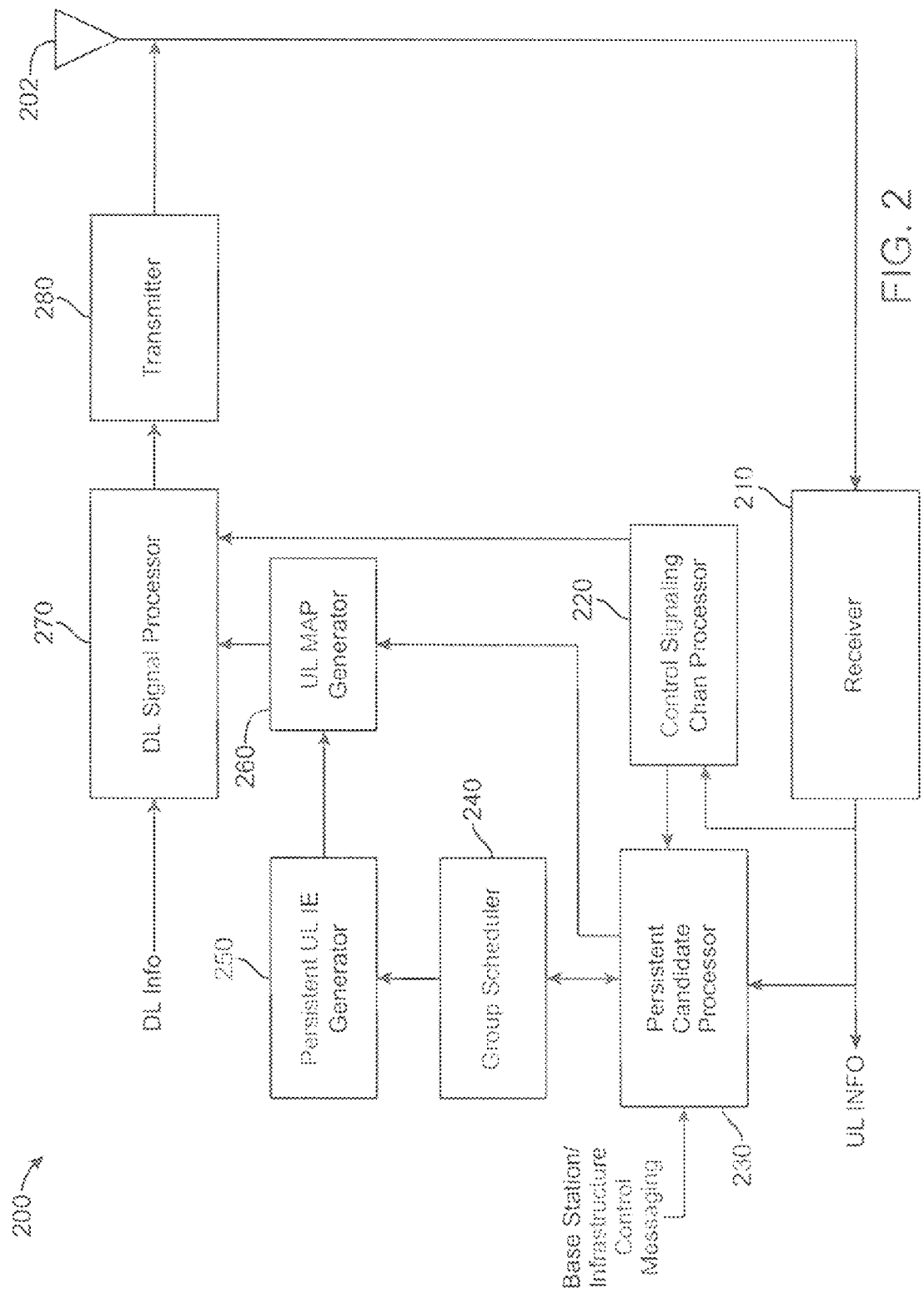
FIG. 2 is a simplified functional block diagram of an embodiment of a base station implementing persistent uplink resource allocation.

FIG. 2 is a simplified functional block diagram of an embodiment of a base station 200 implementing persistent uplink resource allocation. The base station 200 can be, for example, one of the base stations in the wireless communication system of FIG. 1.

The base station 200 includes an antenna 202 that can be coupled to a receiver 210 and transmitter 280 within the base station 200. Although FIG. 2 illustrates a single antenna 202, the antenna 202 can be one or more antennas configured to support multiple transmit and receive operating bands, multiple input, multiple output (MIMO) operation, beam steering, spatial diversity and the like. If the base station 200 supports frequency division multiplexing of the transmit and receive bands, the base station 200 can include a duplexor (not shown) to isolate the transmit signals from the receiver 210. The receiver 210 and transmitter 280 can be distinct or can be part of a transceiver.

The receiver 210 is configured to receive the uplink transmissions transmitted by a client station (not shown), such as one of the client stations of FIG. 1. Initially, a client station can synchronize and register with a base station 200 once the client station enters a coverage area of the base station 200 or upon waking up from a sleep or idle state. The receiver 210 can receive a request for uplink resources in a request from a client station transmitted over a random access channel, a fast feedback channel, piggybacked data channel, in band messaging or any other type of control signaling channel. A control signaling channel processor 220 is coupled to the receiver 210 and operates to determine the presence of an uplink allocation request. The control signaling channel processor 220 may also perform associated duties in combination with one or more functional modules to identify the requesting client station and to identify the nature and size of the resource allocation request. For example, the control signaling channel processor 220 may operate in conjunction with a downlink signal processor 270 to communicate additional information to the client station that enables the client station to communicate the additional bandwidth, nature, and identity information.

A persistent candidate processor 230 can process the uplink resource allocation request, for example, processed by the control signaling channel processor 220 to determine whether the requesting client station is a good candidate for persistent resource allocation. The persistent candidate processor 230 can, for example, determine an express request for a persistent channel or may monitor one or more parameters to determine whether the client station is a candidate for persistent resource allocation. In addition, the persistent candidate processor 230 can receive a persistent request from another element of the base station or other infrastructure element.

The persistent candidate processor 230 may also monitor the received signal to determine a channel characteristic associated with the requesting client station. Alternatively, the persistent candidate processor 230 may monitor the received signal for feedback information from the client station characterizing its channel characteristics. Such signaling may be processed by the control signaling channel processor 220.

The persistent candidate processor 230 can be coupled to a group scheduler 240 and to a uplink MAP generator 260. If the persistent candidate processor 230 determines that the resource request and client station are not candidates for persistent allocation, the persistent candidate processor 230 can signal the UL MAP generator 260 to generate a non-persistent uplink resource allocation.

If the persistent candidate processor 230 determines that the resource request and client station are good candidates for persistent allocation, the persistent candidate processor 230 can communicate the information to the group scheduler 240. The group scheduler 240 can be configured to schedule persistent allocations to one or more groups from a predetermined number of groups. The group scheduler 240 can determine the group or groups based on a variety of parameters and metrics. For example, the group scheduler 240 can attempt to balance persistent allocations across each of the groups or may operate to optimize some other constraint or metric.

The group scheduler 240 can communicate the group information to a persistent UL Information Element (IE) generator 250 that operates to generate the persistent UL allocation IE for the group, including the allocation for the requesting client station. As further described below, group scheduler 240 and persistent UL IE generator 250 may also perform functions related to the start allocation information element and the determination of a logical order of the persistent allocations.

The persistent UL IE generator 250 can communicate the persistent UL allocation IE to the UL-MAP generator 260 for inclusion in the UL-MAP. The UL-MAP generator 260 can be configured to generate the UL-MAP including any persistent and non-persistent UL allocations.

The UL-MAP generator 260 couples the UL-MAP information element to the downlink signal processor 270 which creates the final message for transmission over the downlink. The downlink information can be coupled to the transmitter 280 for broadcast across the coverage area supported by the base station 200.

Figure 3:
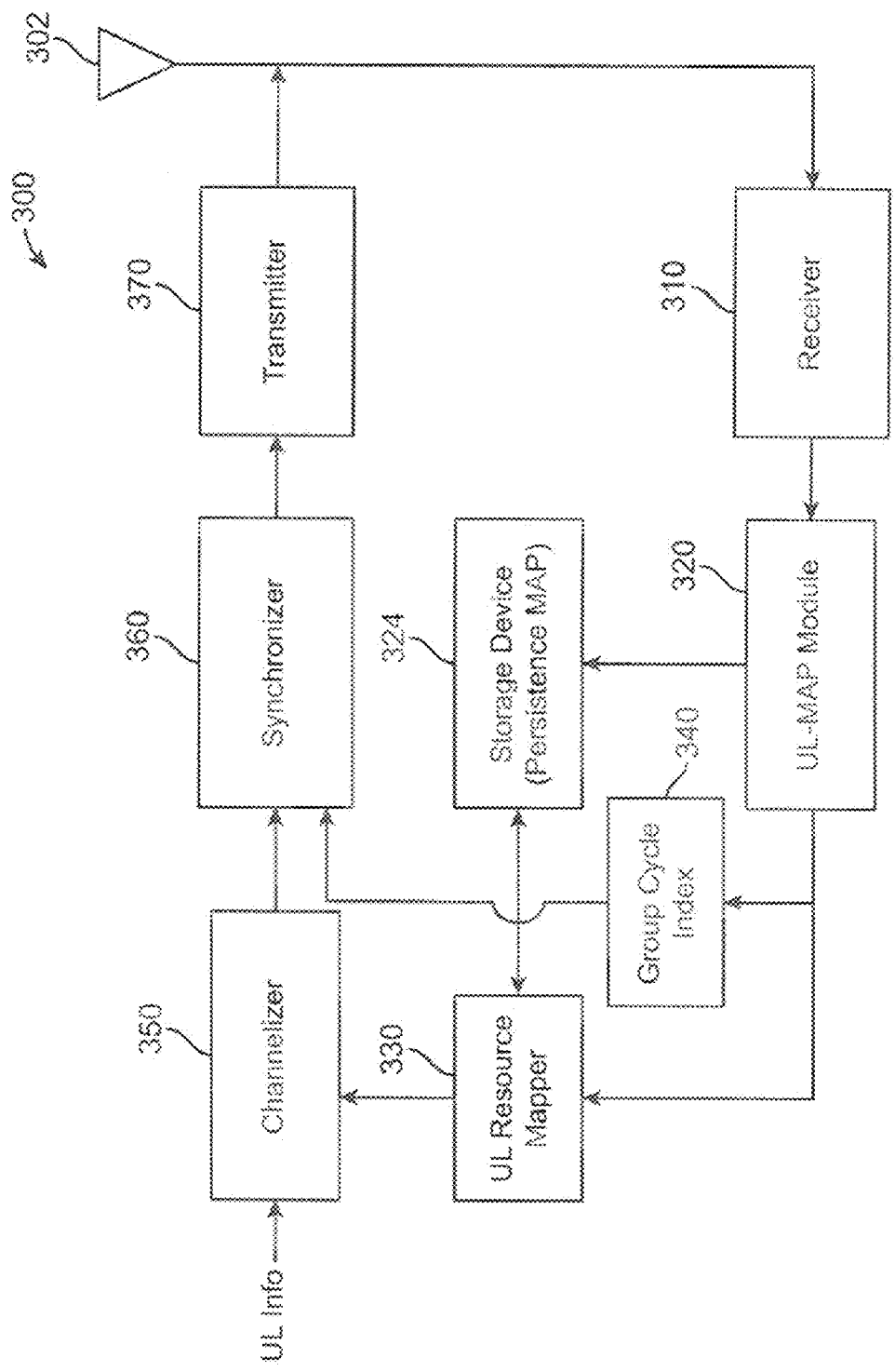
FIG. 3 is a simplified functional block diagram of an embodiment of a client station configured to operate using persistent uplink resource allocation.

FIG. 3 is a simplified functional block diagram of an embodiment of a client station 300 configured to operate using persistent uplink resource allocation. The client station 300 can be, for example, one of the client stations illustrated in the wireless system of FIG. 1.

The client station 300 can include an antenna 302 coupled to a receiver 310 and a transmitter 370. Although a single antenna 302 is shown as shared between a transmitter 370 and receiver 310, multiple antennas can be used.

The receiver 310 can be configured to operate to receive the downlink transmissions from a base station such as the base station of FIG. 2. A UL MAP module 320 coupled to the receiver 310 can be configured to extract the UL-MAP information element from the downlink signal.

The UL-MAP module 320 can be configured to examine the UL-MAP information element to determine whether the client station 300 has been granted uplink resources, and if so, whether the allocation is persistent or non-persistent.

If the UL-MAP module 320 determines that the UL MAP information element indicates a persistent resource allocation for the client station, the UL-MAP module 320 can store the persistent UL allocation information element in a storage device 324. The UL-MAP module 320 can also communicate a persistent UL allocation to a group cycle index module 340 that is configured to determine the group cycle index associated with the UL resource allocation. The group cycle index module 340 can communicate the group cycle index value to a synchronizer 360 to permit the synchronizer 360 to synchronize the UL transmissions to the proper frames.

The UL-MAP module 320 can also communicate the persistent UL-MAP information to a UL resource mapper 330. The UL resource mapper 330 can be configured to compare the current persistent allocation map against the stored persistence map from the storage device 324 to determine the actual UL resources allocated to the client station 300. The UL MAP module 320 may use the storage device 324 to perform functions related to receipt and processing of a start allocation information element.

For example, the UL resource mapper 330 determines whether the start allocation information element occurs logically before or after a previously assigned persistent allocation stored in storage device 324. When the start allocation occurs logically before the previously assigned persistent allocation, the UL resource mapper 330 determines a new allocation or deallocation with reference express information contains in the UL-MAP information element. When the start allocation occurs logically after the previously assigned persistent allocation, the UL resource mapper 330 determines that operation should proceed according to the previously assigned allocation.

The UL resource mapper 330 maps the uplink information to the proper resources in a channelizer 350 based on the resource allocation. For example, the UL resource mapper 330 can be configured to control the subcarriers and symbols that UL information is mapped to in the channelizer 350.

The output from the channelizer 350, which can be, for example, a series of OFDM symbols, is coupled to the synchronizer 360 that can be configured to synchronize the symbol timing to the timing of the frames in which the uplink resource is allocated. The output of the synchronizer 360 is coupled to a transmitter 370 that can be configured to upconvert the signal to a desired operating frequency before transmitting it using the antenna 302.

Figure 4:
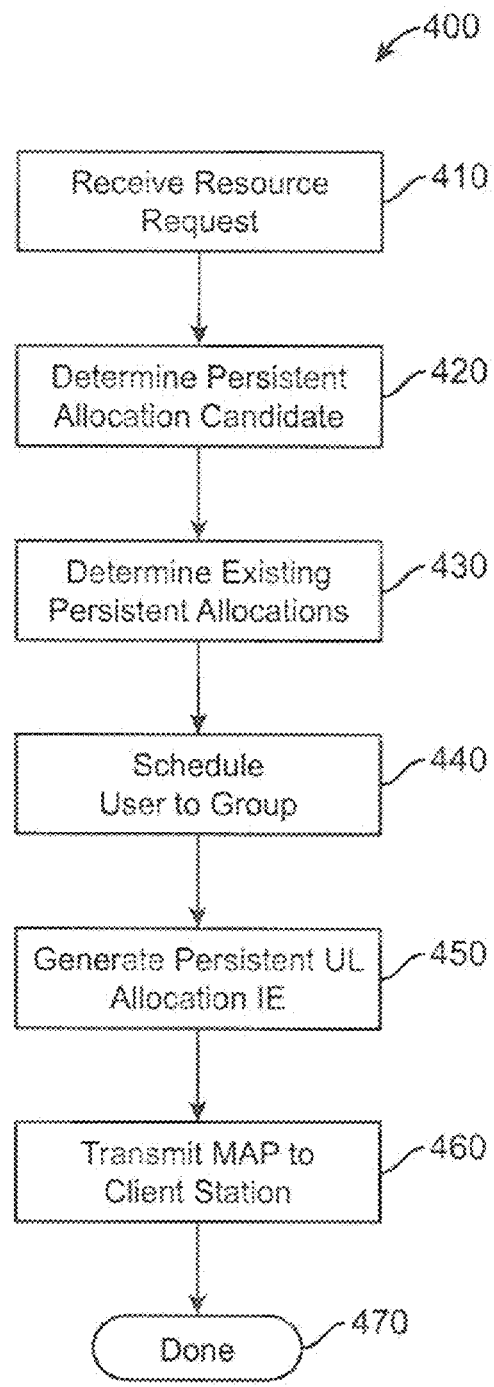
FIG. 4 is a simplified flowchart of an embodiment of a method of persistent uplink resource allocation.

FIG. 4 is a simplified flowchart of an embodiment of a method 400 of persistent uplink resource allocation. The method 400 can be performed, for example, by the base stations of FIG. 1 or the base station of FIG. 2 to implement persistent uplink resource allocation.

The method 400 begins at block 410 when the base station receives a resource request. In one aspect, the request is received via the antenna 202, the receiver 210 and the control signaling channel processor 220 of FIG. 2. In one aspect, another element of the base station or other infrastructure elements determines a persistent allocation may be appropriate.

The base station proceeds to block 420 and determines if the connection is suitable for a persistent resource allocation. In one aspect, the persistent candidate processor 230 of FIG. 2 performs these functions.

The base station proceeds to block 430 and determines whether there are any existing persistent resource allocations. For example, the persistent candidate processor 230 makes this determination with reference to information stored an associated memory. At block 440, the base station schedules the client station and persistent resource allocation to one or more of a predetermined plurality of groups, where each group defines a set of persistent resource allocations. In one aspect, with respect to block 440, one or more elements within the base station, such as the group scheduler 240 shown in FIG. 2, schedules the persistent allocation in a logical order based on a probability that the client station will experience a change to its persistent allocation, as described further below.

The base station proceeds to block 450 and generates a persistent uplink allocation information element for the group having the resource allocation for the client station. The uplink allocation information element can be a complete persistent resource allocation refreshing all persistent resource allocations within the group or can be a partial resource allocation that identifies a subset of the persistent resource allocations in the group. In one aspect, in block 450, the base station also determines a start allocation information element as further described below which allows to transmit only a partial update. In one aspect, the functions of block 450 are performed by group scheduler 240, persistent UL IE generator 250 and UL MAP generator 260.

The base station proceeds to block 460 and transmits the uplink resource allocation information element within a downlink transmission. For example, the base station can be configured to include the uplink persistent resource allocation information element as part of the UL-MAP transmitted in the downlink signal. In one aspect, the functions of block 460 are performed via 230 the downlink signal processor 270, the transmitter 280 and the antenna 202. After transmitting the map information, the base station is done for the frame of information.

Figure 10:
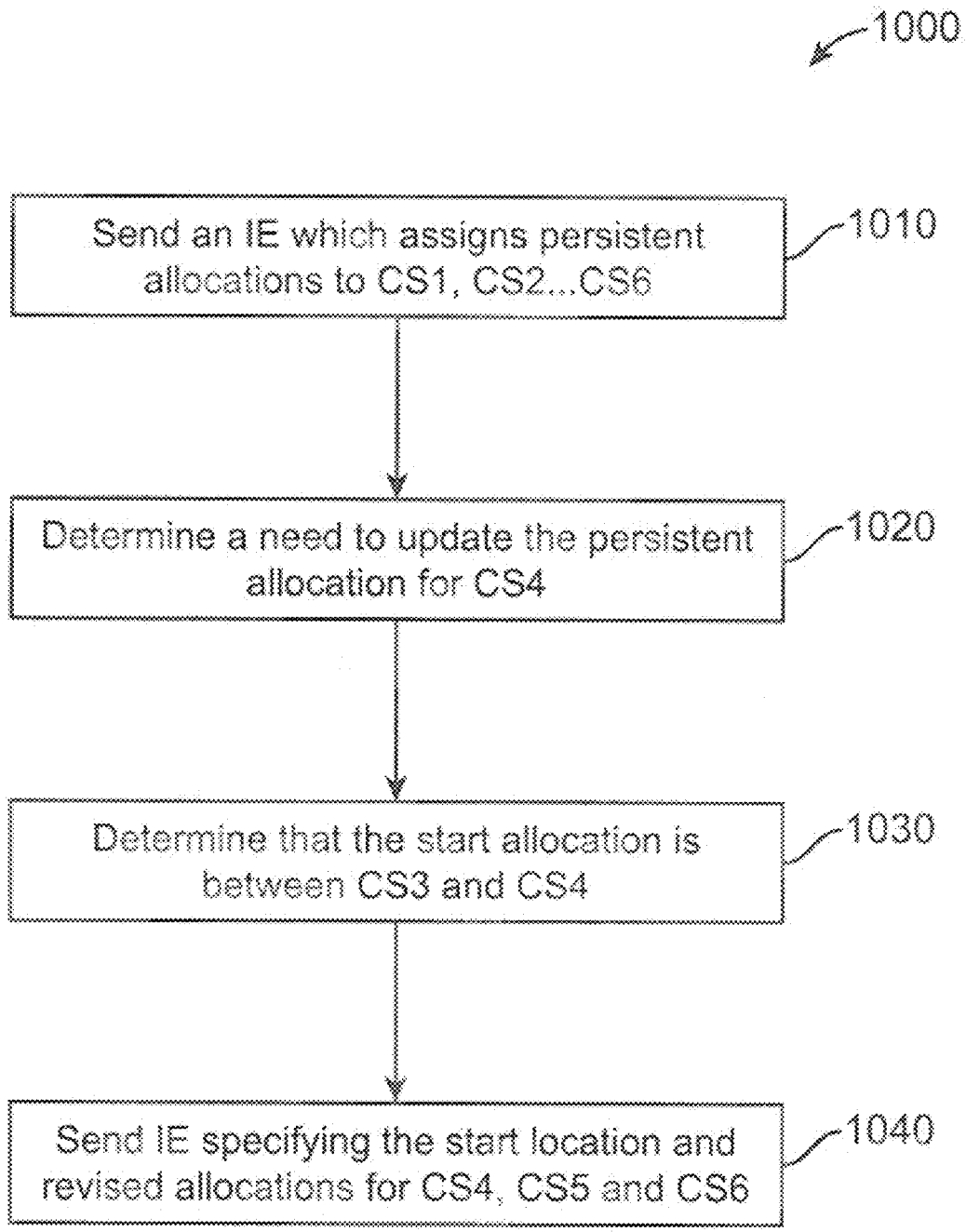
FIG. 10 is a simplified flowchart of an aspect of a method of generating a persistent uplink allocation information element.

FIG. 10 is a simplified flowchart of an aspect of a method 1000 of granting persistent allocations, further illustrating operation according to FIG. 4. In block 1010, the base station sends an information element which assigns persistent allocations to a connection associated with client stations CS1, CS2 . . . CS6. In addition the base station may assign non-persistent allocations to one or more client stations. For purposes of example, it is assumed that the information element specifies that the persistent allocations occur within a logical mapping in numerical order from client station CS1 to client station CS6. Referring back to FIG. 4, block 1010 may represents a first pass through FIG. 4.

In block 1020, the base station determines a need for an update to the second persistent allocation for CS4. Such a change may be based on a voice activity detection (VAD), a change in the size of the allocation due to an updated modulation and coding scheme, a change in the size of an allocation due to an increased or decreased amount of data to be transmitted over the uplink or a variety of other reasons. For example, block 1020 may correspond to the functions of blocks 410 and 420 on a second pass through the flowchart shown in FIG. 4.

In block 1030, the base station determines that the start allocation is between the allocation for CS3 and CS4. For example, in one aspect, the persistent UL IE generator 250 determines the start allocation based on information received from the group scheduler 240 of FIG. 2, corresponding to the functions in block 440 and 450 of FIG. 4. The start allocation indicates a delineation between a set of previously assigned a persistent allocations and a set of allocations defined by the updated information element. For example, as further illustrated in FIG. 7, the base station logically moves the start allocation information element to point to the start of the allocation corresponding to the first client station with in the logical map having a change in its allocation. The base station issues a persistent allocation information element defining allocations for client station having a allocations logically later than the start allocation information element.

In block 1040, the base station sends an updated information element specifying a start allocation and a revised allocation for client stations CS4, CS5, CS6 as well as any non-persistent allocations granted for this frame.

Upon receipt of the updated information element, the client stations CS1, CS2 and CS3 (sometimes called mobile stations, MS) each determine that the start allocation occurs later in the logical mapping than their current allocation, and thus continue to use the most recently specified persistent allocation.

Upon receipt of the updated information element, client stations CS4, CS5 and CS6 each determine that the start allocation occurs earlier in the logical mapping than their current allocation, and begin to use persistent allocation specified in the updated information element.

This method can also be used to efficiently deallocate a persistent allocation. For example, assume that a change to the allocation for client station CS4 occurred and that the persistent allocation with respect to client station CS5 has been deallocated, the updated information element sent in block 1040 may include the same start allocation but only a revised allocation for client stations CS4 and CS6. Upon receipt of the updated information element, client station CS5 determines that the start allocation occurs earlier in the logical mapping than its current allocation but that no new allocation was specified and, thus, cease transmissions over the previously granted persistent allocation. In other aspects, the base station issues an express deallocation.

Likewise, this method can also be used to efficiently grant a new persistent allocation. For example, assume that an initial grant to a client station CS10 is made and that no other changes are needed for the current frame. The base station creates a revised information element which specifies a start allocation equal to what was previously the end of the persistent allocation region, as well as the new grant. Upon receipt of the revised information element, every client station with a persistent allocation determines that the start allocation occurs later in the logical mapping than its current allocation and continues to use the previously granted persistent allocation. The client station CS10 begins to use its new persistent grant.

In one aspect, this functionality is advantageously designed such that the base station performs most of the functionality necessary for implementation. According to this aspect, the client station caches its persistence allocation and simply refreshes the cache based on the start allocation pointer and any new allocations granted in the revised information element, such as by making use of the UL MAP module 320 and storage device 324 of FIG. 3. For example, this functionality can be implemented without the need to use out of band signaling to manage the persistent allocation region and without the need for the client station to store information about allocations made to other client stations. Through the use of the start allocation indication, overhead messaging associated with updating the persistent allocation is reduced in comparison with resending each allocation every time a change occurs.

Figure 5:
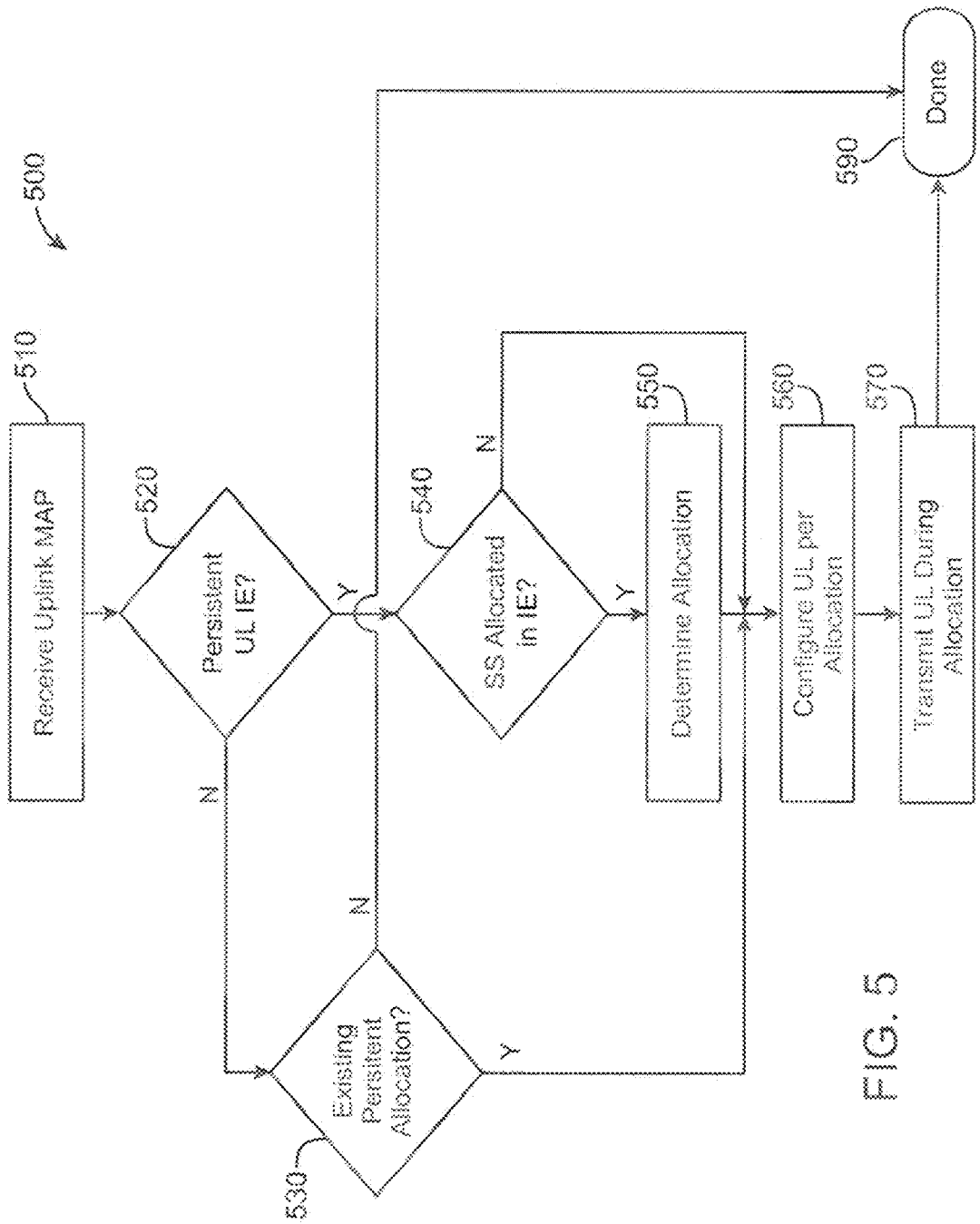
FIG. 5 is a simplified flowchart of an embodiment of a method of operating with persistent uplink resource allocation.

FIG. 5 is a simplified flowchart of an embodiment of a method 500 of operating with persistent uplink resource allocation. The method 500 can be performed by a client station, such as a client station of FIG. 1 or a client station of FIG. 3.

The method 500 begins at block 510 where the client station receives an uplink MAP that may include one or more persistent uplink information elements. In one aspects, these functions are performed by the antenna 302, the receiver 310 and the UL-mapper module 320 of FIG. 3. The client station proceeds to decision block 520 and determines whether there is any persistent uplink information element included within the UL-MAP. In one aspect, this function is performed by the UL-MAP module 320. If not, the client station proceeds to decision block 530.

At decision block 530, the client station determines whether it has a previously assigned active persistent uplink allocation. If not, the client station proceeds to done block 590 and processing is concluded for the present frame. If, at decision block 530 the client station determines that it has a previously assigned active persistent uplink allocation, the client station proceeds to decision block 560, which is described below. In one aspect, the function of block 530 is performed by the UL-MAP module 320, the storage device 324 and the UL resource mapper 330.

If, at decision block 520, the client station determines that a persistent UL allocation information element exists, the client station proceeds to decision block 540 to determine if any persistent uplink allocation is directed to the client station. For example, the client station determines whether any current persistent resource allocation occurs logically before or after the point indicated by an uplink allocation starting point. If the starting point is logically after a currently active persistent resource allocation, the base station is not changing the client station's persistent allocation and flow continue to block 560. In one aspect, the functions of block 540 are performed by the UL MAP module 320 with reference to the storage device 324.

If, at decision block 540 the client station determines that a persistent uplink allocation is directed to the client station, the client station proceeds to block 550 to determine the resources allocated to the client station. For example, the client station determines that a current persistent resource allocation occurs logically after the point indicated by the uplink allocation starting point specified in the information element, thus indicating that the base station is changing the client station's persistent allocation. The client station examines the persistent uplink information element to determine an express allocation or deallocation contained therein. In one aspect, these functions are performed by the UL resource mapper 330 transmission and UL MAP module 320 with reference to the storage device 324. Flow continue to block 560.

In block 560, the client station configures the uplink per the allocated resources, whether newly or previously granted. The client station proceeds to block 570 and transmits the uplink signal during the allocated frames and using the allocated resources. In one aspect, functions block 560 and 570 are performed by the uplink resource mapper 330, the channelizer 350, the synchronizer 360, the transmitter 370, and the antenna 302 of FIG. 3.

Figure 6:
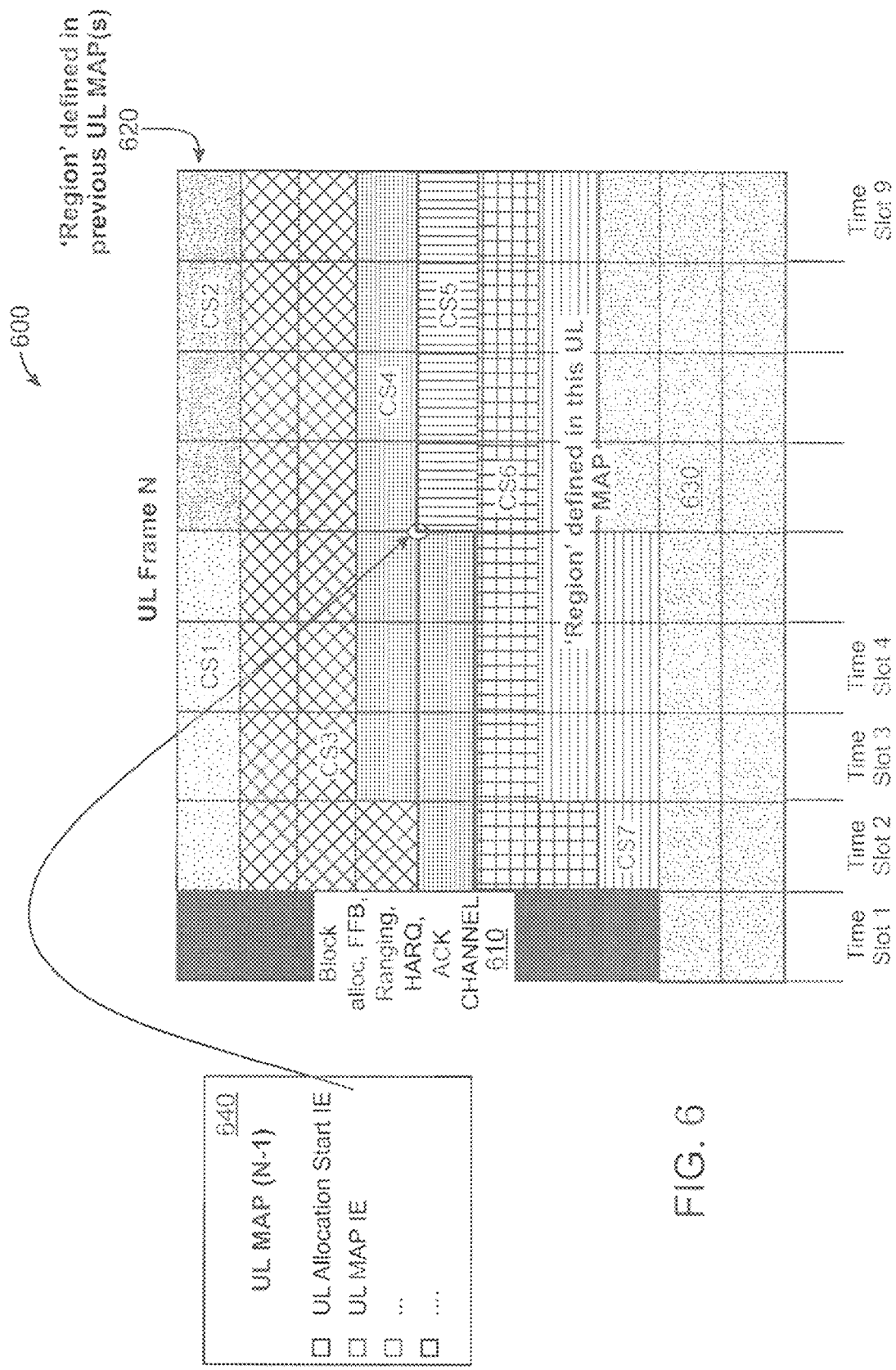
FIG. 6 is a simplified embodiment of an uplink frame.

FIG. 6 is a simplified embodiment of an uplink frame 600 having a first portion of resources 620 within the frame 600 having persistent allocation and a second portion of resources 630 within the frame 600 having persistent and non-persistent allocation. The frame 600 may include one or more portions, e.g. 610, that are configured to carry overhead information, acknowledgement messages, random access channel requests, or other information that is transmitted without an express resource allocation.

The frame 600 can be interpreted as illustrating two-dimensions over which resources can be allocated. For example, the horizontal scale can represent time and the vertical scale can represent frequency. Thus, each block can represent an allocation unit. For example, each block within the frame 600 can represent a slot having a predetermined number of symbol periods and a predetermined number of subcarriers.

An UL Allocation Start IE 640 can be configured, for example, as a pointer in the UL-MAP that identifies the boundary between allocations defined in one or more previous frames and allocations defined in this frame. For example in this case, the first portion of resources 620 includes assigned persistent allocation defined in previous UL MAPS for the client stations CS1, CS1, CS3 and CS4. The second portion of the resource is 630 includes persistent and nonpersistent allocations assigned in the current UL MAP, such as the persistent allocations assigned to CS5, CS6 and CS7.

Figure 7:
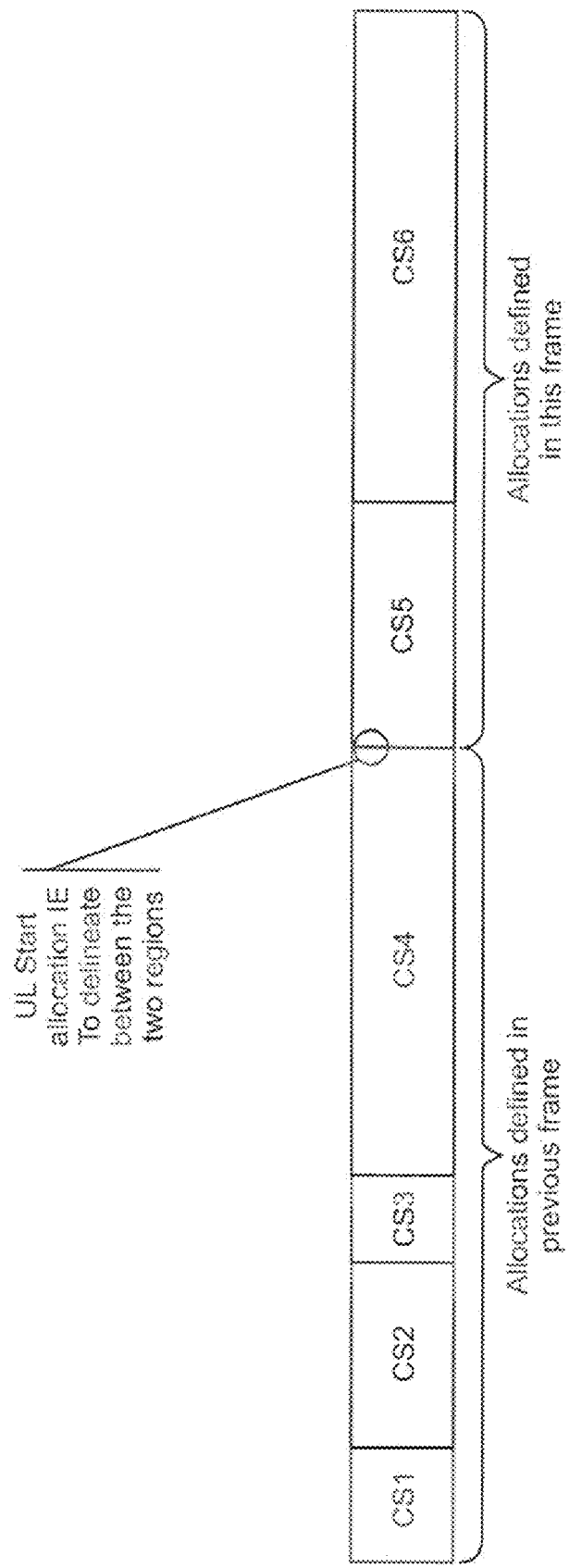
FIG. 7 is a simplified representation of a logical mapping of an uplink resource allocation.

FIG. 7 is a simplified representation of a logical mapping of an uplink resource allocation. The representation of FIG. 7 illustrates a portion of the UL frame as a single ribbon having a width equal to a width of an allocation unit. The frame portion illustrated in FIG. 7 shows the transition from the persistent allocated resources allocated to the client stations CS1, CS2, CS3, and CS4 to the persistent or non-persistent resources allocated to client stations CS5 and CS6. The UL Allocation Start IE points to the end of the last persistent resource allocation defined in a previous frame and the first allocation, whether persistent or non-persistent, which is defined in this frame.

As can be seen by comparing FIG. 6 to FIG. 7, the single ribbon shown in FIG. 7 is a logical mapping of a frame such as the one shown in FIG. 6. The logical mapping defines an identified ordering which is known by both the base station and the client stations. However, the identified ordering need not, and typically does not, occur in sequential time or frequency order. For example, if we assume in FIG. 6 that the horizontal axis is time and the vertical axis is frequency, the client stations CS1, CS3, CS4, CS6 and CS7 all transmit during the second time slot. In many systems, the allocation units assigned to a single client station are spread throughout the uplink frame rather than in a localized region as shown in FIG. 6. Because the base station and client stations are each aware of the logical mapping used in the system, the uplink allocation start information element can be used to specify any point in the logical mapping before which allocations were defined in a previous frame and after which allocations are defined in this frame, regardless of the actual timing of transmissions made by the client stations.

Figure 8A:
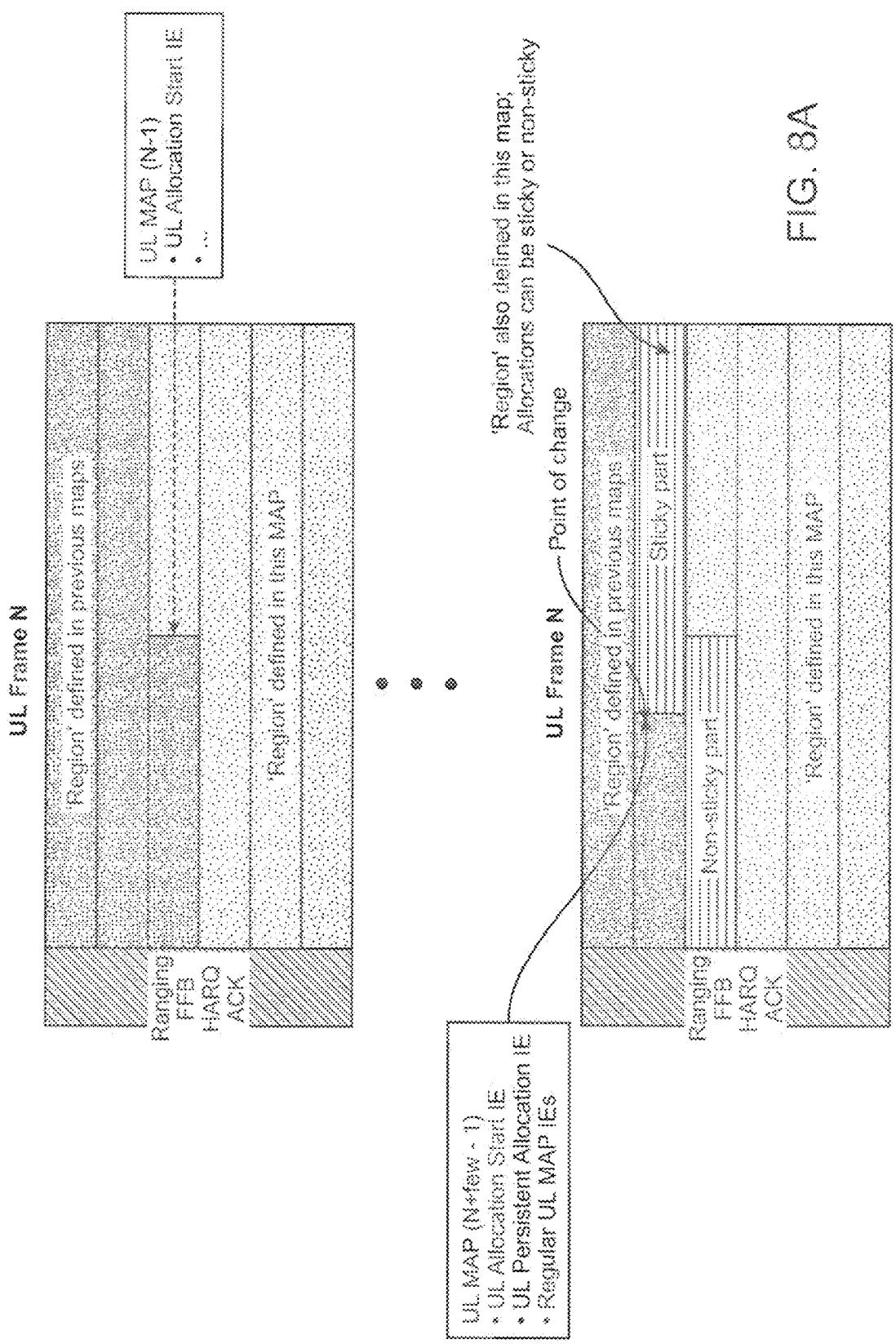
FIGS. 8A-8B are simplified embodiments of uplink frames illustrating partial persistent resource reallocation.

FIG. 8A is a simplified embodiment of uplink frames illustrating partial persistent resource reallocation. The first frame in FIG. 8A illustrates a resource allocation for a particular frame in time. The second frame in FIG. 8A illustrates a partial resource allocation, where one or more persistent or non-persistent allocated resources are modified, added, deleted, or otherwise updated. The region of persistent resources allocated in prior UL-MAPS that is not updated need not be communicated again in the present UL-MAP. The UL Allocation Start IE points to the beginning of the changes in resource allocation.

Figure 8B:
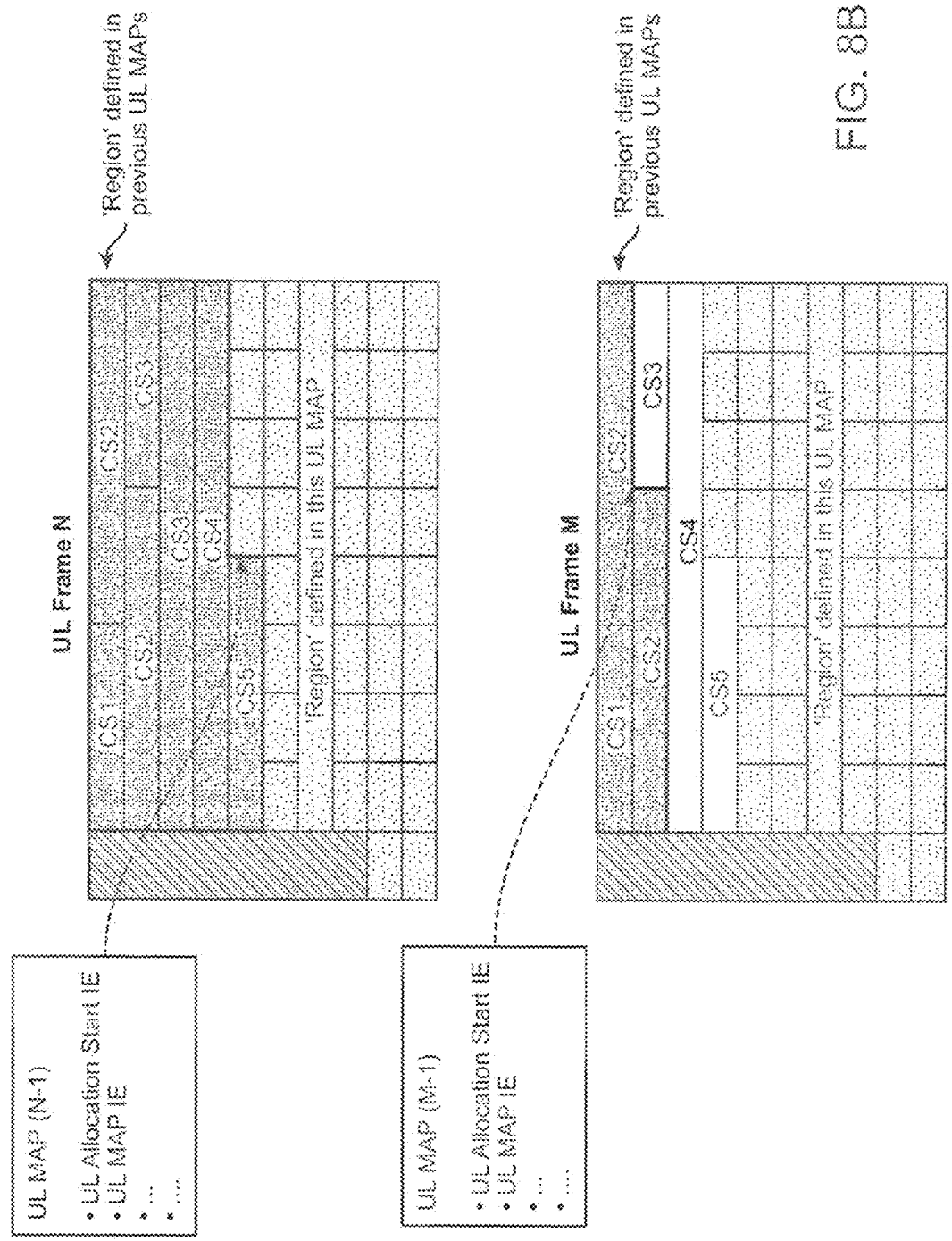

FIG. 8B illustrates uplink frames with partial persistent resource allocation. A first frame shows persistent resources that were allocated in a prior UL-MAP. The UL Allocation Start IE points to the boundary between the region defined in this uplink MAP and the region defined in previous uplink MAPs. The UL-MAP for the present frame likely does not include any persistent resource allocation.

The second frame illustrates a partial change in persistent resource allocation at some later frame. The UL Allocation Start IE points to the beginning of the changed resources. Thus, in one aspect the UL Allocation Start IE is used to delineate between a 'region' of the UL frame, which has been defined in previous UL MAPs (sticky) and a 'region' of the UL frame defined in this UL MAP (can be both sticky and non-sticky). Note that the persistent resource allocation for client stations CS1 and CS2 do not change. The UL-MAP for this frame need not include any express resource grant for those client stations, as they continue to utilize the persistent resources previously allocated to them. The persistent resources for client stations CS3, CS4, and CS5 may be different. Typically, at least the resource allocation to client station CS3 is different, thus triggering the update of resources allocated to client stations CS4 and CS5.

If a client station requires a change to its persistent allocation, all client stations having an allocation which are later in the logical mapping are typically granted a new allocation. Therefore, there is more overhead associated with making a change to a persistent allocation which is toward the beginning in the logical map rather than towards the end of the logical map. In one aspect of the present disclosure, the base station sorts the allocation grants within the logical mapping according to the probability that the client station will require a change to its persistent allocation.

For example, a client station which is moving rapidly is more likely to change its modulation and coding scheme than a client station which is stationary. Therefore it may be advantageous for fast-moving client stations to have allocations towards the end of the logical mapping. Thus, a mobility factor can be used, at least in part, to determine a rate of change factor for each client station.

Likewise a client station with degraded wireless link performance is more likely to require a change to its modulation and coding scheme. Thus, a link performance parameter (such as, signal to noise ratio, packet or bit error rate, carrier to noise ratio, energy per bit divided by noise power density etc.) may be used, at least in part, to determine a rate of change factor for each client station. In addition, some types of links are more likely to experience a need for a change in a persistent allocation and, thus, the type of connection may be used, at least in part, determine a rate of change factor. For example, a VoIP connection may experience frequency voice activity masks and, therefore, have a high rate of change factor.

Figure 9:
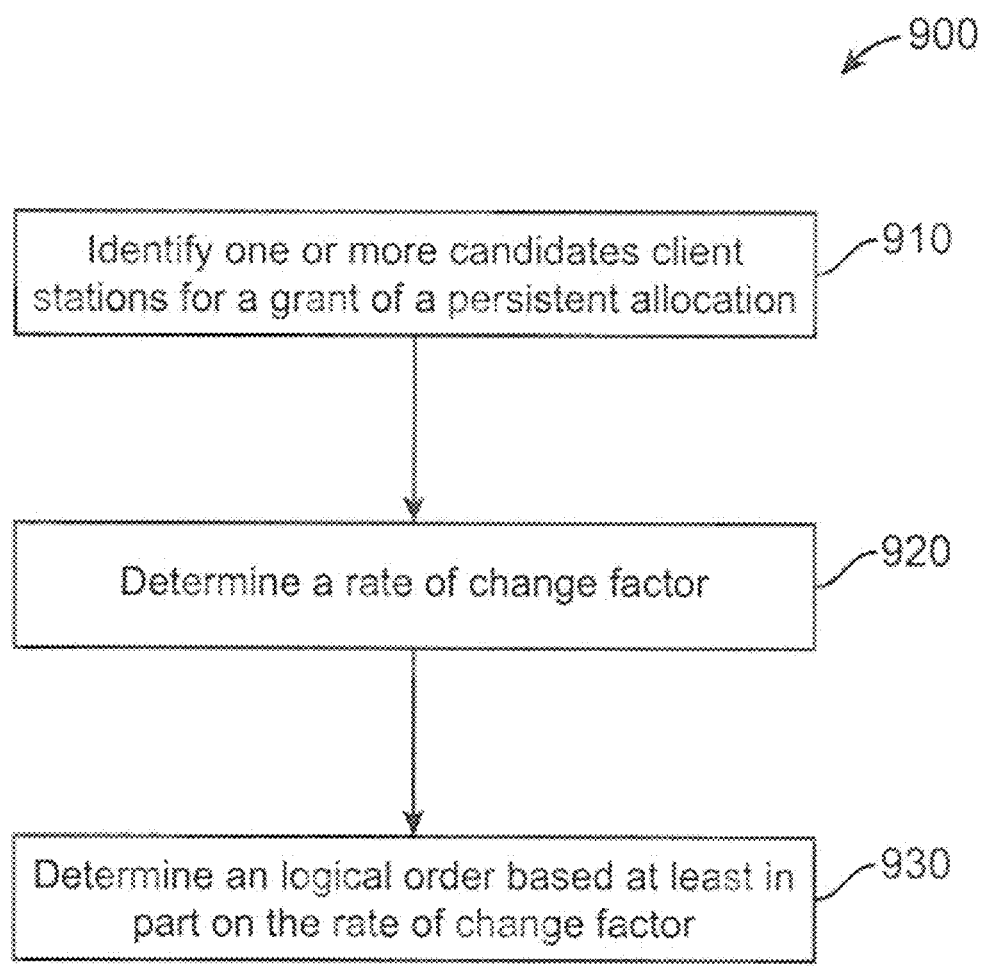
FIG. 9 is a simplified flowchart of an aspect of a method of efficiently assigning a persistent resource allocation.

FIG. 9 is a simplified flowchart of an aspect of a method 900 of efficiently assigning a persistent resource allocation. In block 910, the base station identifies one or more client stations for which it is going to grant an original or updated persistent allocation. The base station determines a rate of change factor for each of the client stations in block 920. In block 930, the base station determines a logical order based at least in part on the rate of change factor. For example, the base station schedules the allocations within a logical mapping so that client stations with a lower rate of change factor are scheduled logically before client stations with a higher rate of change factor.

In one aspect, if the client station misses receiving an updated persistent map information element, it is unable to decode the uplink persistent map, which can lead to a the client station getting out of sync with respect to its persistent allocation assigned to it by the base station. In one aspect, the client station should not transmit if it detects a loss of frame in which it may have had a persistent allocation. In another aspect, the base station may provide periodic MAP refresh specifying all active persistent allocations to address any sync problems which may have occurred. In another aspect, the base station detects that a client station is potentially out of sync by monitoring the client station transmission in the uplink, which the base station does anyway in typical implementations. If the client station does not transmit in the designated persistent allocation, the base station can consider that this is an indication that the client station has experienced a lost frame event and can issue a MAP refresh.

Thus, among other things, described herein are methods and apparatuses for efficiently assigning persistent resources. In one aspect, when at least one persistent allocations is made or updated, the base station sends an information element to a set of client stations. The information element includes a start allocation and a list of express grants of persistent allocations. The start allocation indicates a delineation between a set of previously assigned persistent allocations and a set of persistent and/or non-persistent allocations defined by the current information element. When received by a client station, the client station compares the start allocation with the starting point of its current persistent allocation. If the starting point is logically before the start allocation, the client station continues to operate according to the previously assigned persistent allocation. If its starting point is logically after the start allocation, the client station begins to operate according any grant included within the current information element. In one aspect, the base station assigns resources to the client stations in a logical order based upon the probability that the client station will incur an update to its persistent allocation.

In some embodiments, a client station's persistent allocation may be deallocated or temporarily deactivated. In addition, its persistent allocation may be changed such as due to the deallocation or deactivation of a persistent allocation of another client station's resource allocation.

The client station that is deallocated or temporarily deactivated simply ceases transmitting on its allocation. In one aspect, a client station having a persistent allocation which occurs logically after the deallocated/deactivated allocation determines a new persistent allocation. For example, the client station can determine the magnitude of the change, in terms of the number of vacated allocation units, based on the magnitude of the persistent allocation which has been deallocated or deactivated. The client station can shift its resource allocation according to the size of the temporarily deactivated resource allocation.

For example, the base station transmits mask information as part of granting persistent allocations. Such masks are often used in order to support VAD (voice activity detection) in the client station. VAD can be used by voice codec to suppress VoIP packet generation when the user is silent. The Mask field can be a bit mask used to indicate that certain users in the persistent allocation array are silent and thus do not have an allocation in the persistent array until next update.

In one aspect, a mask is used to support the efficient deallocation of persistent resources. Users previously provided a persistent resource allocation can simply shift in accordance with the bit value (0/1) to compress the allocations to utilize the resource released by the client stations that are marked with zero value. The advantage of using the Mask instead of simply making an update to the persistent allocation array is that it will cost less overhead.

Because the base station may update a subset of the persistent resource allocation without sending out the entire persistent resource allocation information, the base station may track a presumed client station knowledge of the entire persistent allocation information. The base station may only need to track this presumed knowledge until the entire persistent resource allocation information is refreshed or otherwise rebroadcast.

The base station can also include information in the persistent uplink resource allocation information element that identifies a deallocation or temporary deactivation of a previously allocated persistent uplink resource. The deallocation of resources for a particular client station may be temporary and the resources may be re-allocated to the same client station. Alternatively, if the client station has completed transmissions or otherwise dropped the communication link, the deallocation may temporarily indicate the absence of resources allocated to the client station until the complete persistent resource allocation information is refreshed.

Figure 11:
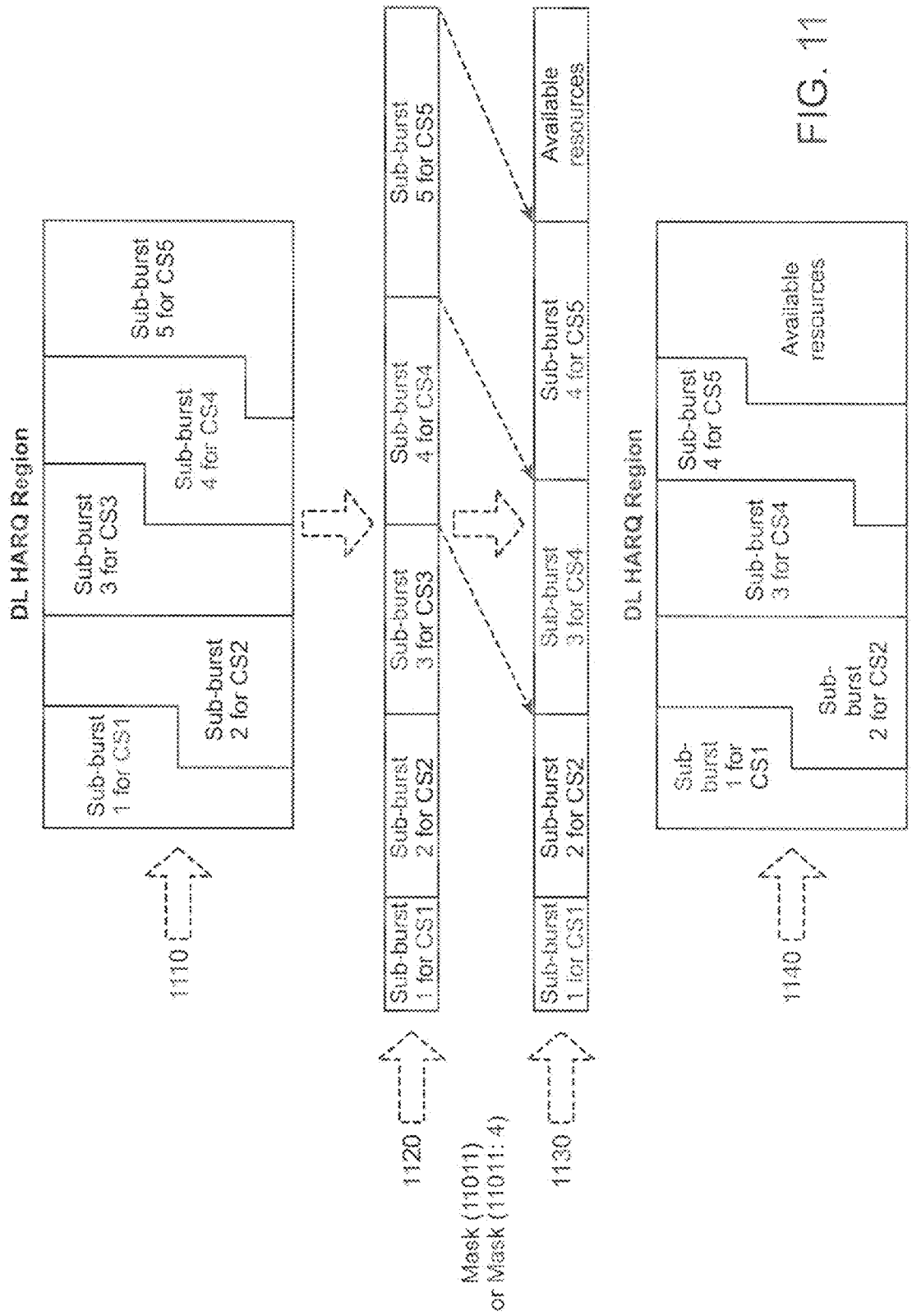
FIG. 11 is a simplified diagram showing a series of persistent allocation regions of a downlink frame and illustrating use of a mask.

FIG. 11 is a simplified diagram showing a series of persistent allocation regions of a downlink frame and illustrating use of a mask. The persistent allocation region includes allocations for five client stations (CS1-CS5) which are currently assigned in numerical order to sub-burst 1 to sub-burst 5. A logical map 1120 shows the corresponding logical mapping in a single ribbon format, similar to the logical mapping shown in FIG. 7. In one aspect, the base station uses a mask to deallocate/deactivate previously granted persistent allocations. The position of the bit within the mask represents the position of the sub-burst within the persistent allocation region. The value of the bit indicates whether a client station should cease using a previously assigned persistent allocation.

By way of example, assume that the base station would like to deallocate the persistent allocation corresponding to client station number 3. It sends a mask which indicates which allocations are remaining allocated and which allocations have been deallocated/deactivated. Thus, to deallocate client station 3, the base station sends a mask as follows: (1,1,0,1,1). The leading two 1's indicate that the persistent allocations granted to client stations 1 and 2 have not been deallocated. The zero indicates that client station 3 should cease transmission on the previously assigned persistent allocation. And, the last two 1's indicate that the persistent allocations granted to client stations 4 and 5 have not been deallocated. In response, each client station with an allocation which occurs logically after the allocation assigned to client station 3 shifts its allocation logically earlier by the magnitude of the persistent allocation formerly assigned to client station 3.

Thus, in the frame in which the deallocation becomes effective, a logical ribbon 1130 shows the resulting allocations. Namely, sub-bursts 1 and 2 remain unchanged. Sub-burst 3 now carries downlink data for client station 4 and is the size of the allocation assigned to client station 4. Sub-burst 4 carries downlink data for client station 5 and is the size of the allocation assigned to client station 5. The persistent allocation region 1140 shows the resulting downlink frame based on the logical ribbon 1130. Note that it is possible to deallocate several persistent allocations in one mask by setting the corresponding bit positions to zero.

According to the aspect just described, client stations 4 and 5 must know the size of the allocation assigned to client station 3 so that they can shift their allocations earlier by the proper amount. In one aspect, each client station stores an indication of the size of each allocation which occurs logically before its own. Such information can be determined by monitoring the downlink map IE, both in terms of initial grants and deallocations/deactivations indicated by the masks.

In another aspect, the mask includes information about the size of the deallocated/deactivated allocations. For example, the base station sends a mask as follows: (1, 1, 0, 1, 1: 4) indicating that the client station number 3 has been deallocated and that its allocation was 4 allocation units in magnitude. If more than one allocation/deactivation occurs in one frame, the base station sends a mask as follows: (1, 1, 0, 0, 1: 4, 6), thus indicating that both the client station 3 and client station 4 have been deallocated and that client station 3's allocation was 4 allocation units in magnitude and client station 4's allocation was 6 allocation units in magnitude.

Figure 12:
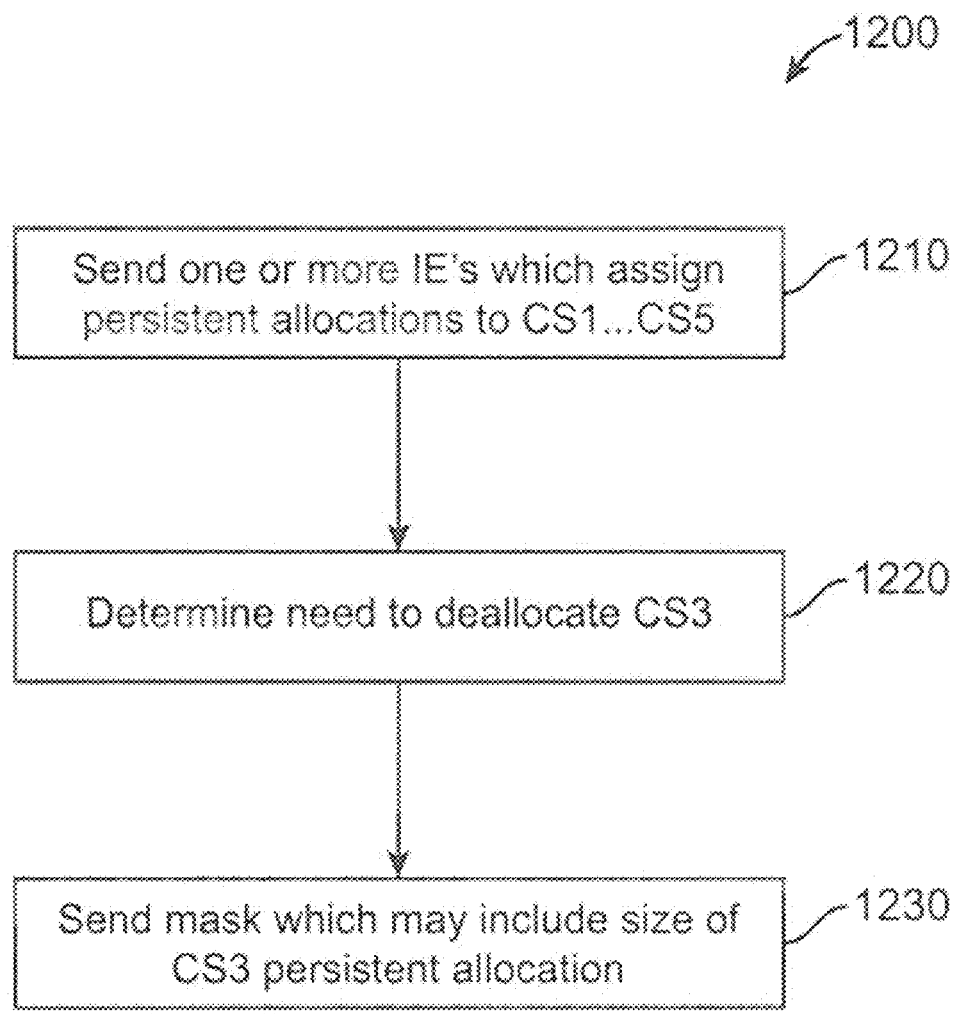
FIG. 12 is a simplified flowchart of an aspect of a method of deallocating a persistent resource allocation using a mask from the perspective of a base station.

FIG. 12 is a simplified flowchart of an aspect of a method 1200 of deallocating a persistent resource allocation from the perspective of a base station. In block 1210, the base station sends one or more IEs granting persistent allocations, such as to client stations 1-5. In one aspect, a transmitter similar to the transmitter 370 of FIG. 2 performs this function. Again, for ease of explanation, we assume that the persistent allocations occur in numerical order in the logical mapping. In block 1220, the base station determines a need to deallocate client station 3. In one aspect, a persistent candidate processor similar to the persistent candidate processor 230 of FIG. 2 performs this function. In block 1230, the base station sends a mask which may include an indication of the size of the persistent allocation formally granted to client station 3. In one aspect, the mask is developed in a group scheduler similar to group scheduler 240 of FIG. 2.

Figure 13:
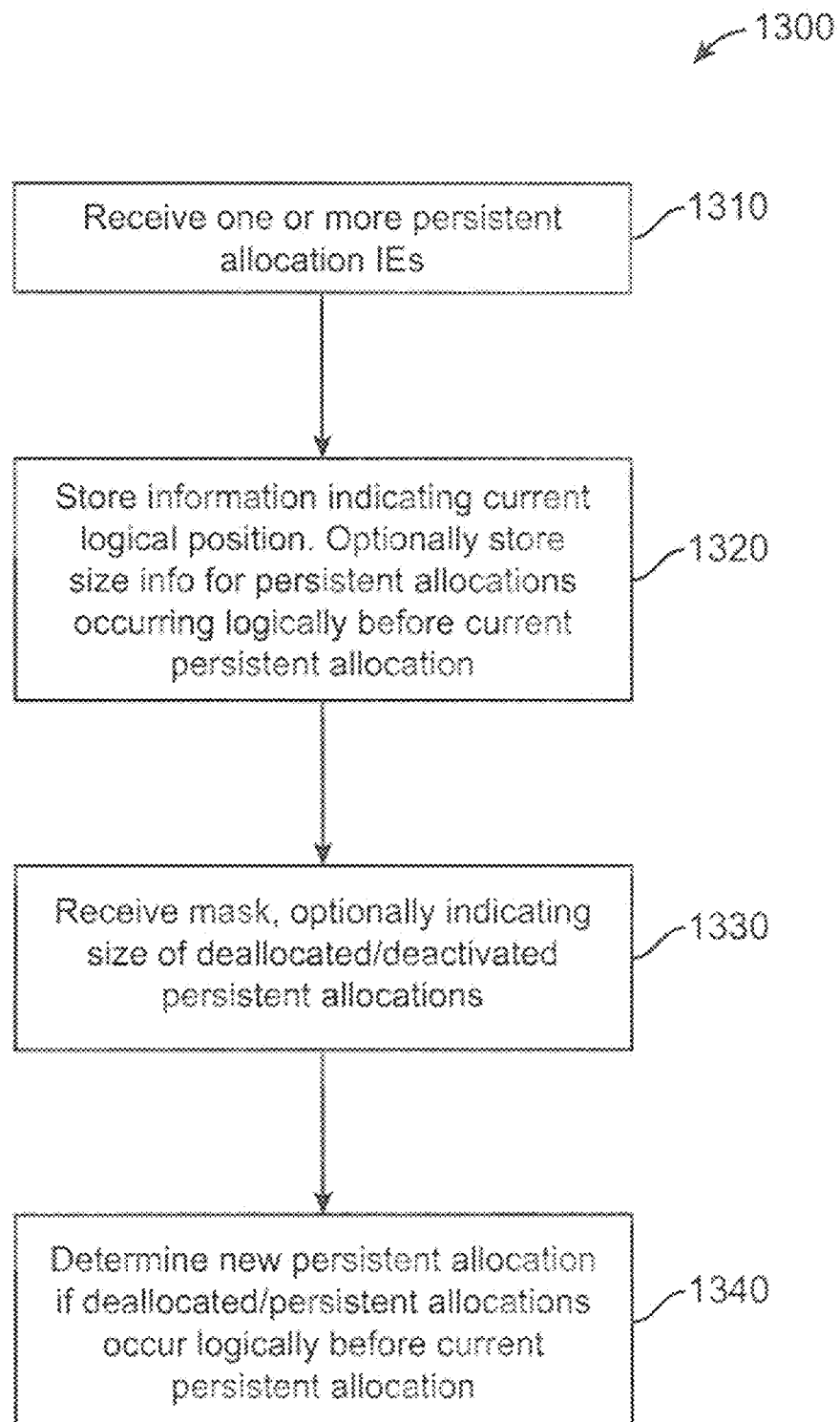
FIG. 13 is a simplified flowchart of an aspect of a method of deallocating a persistent allocation resource using a mask from the perspective of a client station.

FIG. 13 is a simplified flowchart of an aspect of a method 1300 of deallocating a persistent allocation resource from the perspective of a client station. In block 1310, the client station receives one or more IEs granting persistent allocations, such as to client stations 1-5. For example, the client station may receive the IE's using a receiver similar to receiver 310 of FIG. 3. Again, for ease of explanation, we assume that the persistent allocations occur in numerical order in the logical mapping. In block 1320, the client station stores information regarding its current logical position within the persistent allocation region. In one aspect, the client station also stores an indication of the size of persistent allocations occurring logically before its persistent allocation. For example, such information may be stored in memory such as the storage device 324 shown in FIG. 3. In block 1330, the client station receives a mask indicating that one or more persistent allocations has been deallocated/deactivated. In one aspect, the mask also includes an indication of the size of any deallocated/deactivated persistent allocations. In block 1340, the client station determines a new persistent allocation if the deallocated/deactivated persistent allocations occur logically before its persistent allocation. For example, the client station shifts its allocation logically earlier by the sum of the magnitude of persistent allocations that have been deallocated and that occur logically earlier than its own using control logic similar to the resource mapper 330 shown in FIG. 3.

Although FIGS. 11, 12 and 13 illustrate were described with respect to downlink persistent allocations, the illustrated principles may be readily applied to the uplink.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure.

What is claimed is:

1. A method for facilitating allocating resources in a wireless communication system, the method comprising:
   receiving, at a client station, a first information element specifying a first persistent allocation of one of the resources and a first logical mapping of the one of resources within a frame;
   receiving, at the client station, an indication of a vacated allocation of another one of the resources having a second logical mapping of the another one of the resources; and
   continuing to operate according to the first persistent allocation on a condition that the client station determines, based on the indication of the vacated allocation, that the second logical mapping is logically after the first logical mapping.

2. The method of claim 1, wherein the indication of a vacated allocation includes an indication of a magnitude of a deallocated persistent allocation.

3. The method of claim 1, further comprising:
   determining a new persistent allocation on a condition that the second logical mapping is logically before the first logical mapping.

4. The method of claim 3, further comprising:
   receiving an information element that specifies a magnitude of the vacated allocation.

5. The method of claim 1, wherein the first persistent allocation is a downlink allocation.

6. A wireless client station, comprising:
   a receiver configured to receive a first information element specifying a first persistent allocation of a first resource and a first logical mapping of the first resource;
   the receiver being configured to receive an indication of a vacated allocation of a second resource having a second logical mapping of the second resource; and
   the receiver being configured to continue operating according to the first persistent allocation on a condition that the client station determines, based on the indication of the vacated allocation, that the second logical mapping is logically after the first logical mapping.

7. The client station of claim 6, wherein the indication of a vacated allocation includes an indication of a magnitude of a deallocated persistent allocation.

8. The client station of claim 6, further comprising:
   a resource mapper configured to determine a new persistent allocation on a condition that the second logical mapping is logically before the first logical mapping.

9. The client station of claim 8, wherein the receiver is configured to receive a second information element that specifies a magnitude of the vacated allocation.

10. The client station of claim 6, wherein the first persistent allocation is a downlink allocation.

11. A non-transitory machine readable medium storing a set of instructions for execution by one or more processors in a client station for facilitating allocating resources in a wireless communication system, the set of instructions, when executed by the one or more processors, to:
    receive a first information element specifying a first persistent allocation of one of the resources and a first logical mapping of the one of resources within a frame;
    receive an indication of a vacated allocation of another one of the resources having a second logical mapping of the another one of the resources; and
    continue to operate according to the first persistent allocation on a condition that the client station determines, based on the indication of the vacated allocation, that the second logical mapping is logically after the first logical mapping.

* * * * *